United States Patent
Tanaka

(10) Patent No.: US 11,194,185 B2
(45) Date of Patent: Dec. 7, 2021

(54) DISPLAY DEVICE

(71) Applicant: Funai Electric Co., Ltd., Osaka (JP)

(72) Inventor: Kazuya Tanaka, Osaka (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 0 days.

(21) Appl. No.: 17/106,737

(22) Filed: Nov. 30, 2020

(65) Prior Publication Data

US 2021/0263371 A1    Aug. 26, 2021

(30) Foreign Application Priority Data

Feb. 21, 2020    (JP) .............................. JP2020-027834

(51) Int. Cl.
  *G02F 1/1333*    (2006.01)
  *G02F 1/1335*    (2006.01)

(52) U.S. Cl.
  CPC .. *G02F 1/133317* (2021.01); *G02F 1/133308* (2013.01); *G02F 1/133504* (2013.01); *G02F 1/133553* (2013.01); *G02F 1/133314* (2021.01); *G02F 1/133322* (2021.01)

(58) Field of Classification Search
  None
  See application file for complete search history.

(56) References Cited

U.S. PATENT DOCUMENTS

| 2011/0001891 A1* | 1/2011 | Yoshikawa ....... G02F 1/133608 348/790 |
| 2013/0201663 A1* | 8/2013 | Cho ................. G02F 1/133608 362/97.2 |
| 2015/0078032 A1 | 3/2015 | Horiguchi et al. |

FOREIGN PATENT DOCUMENTS

WO    2014/069405 A1    5/2014

* cited by examiner

*Primary Examiner* — Phu Vu
(74) *Attorney, Agent, or Firm* — Global IP Counselors, LLP

(57) ABSTRACT

A display device includes a light source, an optical member, a display cell, and a guide member. The optical member is irradiated with light from the light source. The display cell is irradiated with the light passing through the optical member. The guide member has a first positioning section that positions the display cell and the optical member in a direction along a display surface of the display cell, and a second positioning section that is formed integrally with the first positioning section and positions the display cell and the optical member in a thickness direction of the display cell. The first positioning section has a first side surface that is opposite a side surface of the display cell and a second side surface that is opposite a side surface of the optical member and is provided outside of the first side surface in the direction along the display surface.

20 Claims, 13 Drawing Sheets

FIRST EMBODIMENT

FIRST EMBODIMENT

CROSS SECTION TAKEN ALONG 600-600 LINE

SIXTH MODIFICATION
EXAMPLE OF FIRST
EMBODIMENT

SEVENTH MODIFICATION
EXAMPLE OF FIRST
EMBODIMENT

DISPLAY DEVICE

CROSS-REFERENCE TO RELATED APPLICATIONS

This application claims priority to Japanese Patent Application No. 2020-027834 filed on Feb. 21, 2020. The entire disclosure of Japanese Patent Application No. 2020-027834 is hereby incorporated herein by reference.

BACKGROUND

Field of the Invention

The present invention generally relates to a display device. More specifically, the present invention relates to a display device equipped with a positioning member for positioning a display cell and an optical member.

Background Information

Generally, a display device is equipped with a positioning member for positioning a display cell and an optical member (see, International Publication WO 2014/069405 (Patent Literature 1), for example).

Patent Literature 1 above discloses a display apparatus comprising a liquid crystal display panel, a light source unit, a light guide plate, a diffusion plate, and a panel chassis having a reflection plate that reflects light emitted from the light guide plate and supporting the diffusion plate and the liquid crystal display panel.

The display apparatus disclosed in Patent Literature 1 above reduces the size of the panel chassis in a direction perpendicular to the side surfaces of the diffusion plate and the liquid crystal display panel, and arranges light sources and other components behind the reflection plate in order to achieve a narrower frame of the display apparatus.

SUMMARY

However, as is the case with the display apparatus described in Patent Literature 1 above, when the size of the panel chassis for positioning the diffusion plate and the liquid crystal display panel in the direction perpendicular to the side surfaces thereof is reduced to achieve a narrower frame, the overlap allowance of the diffusion plate and the liquid crystal display panel relative to the panel chassis is also reduced. If the overlap allowance is reduced, then the diffusion plate and the liquid crystal display panel may fall out of the panel chassis during transportation. If the diffusion plate and the liquid crystal display panel fall out, then the display apparatus will be defective. Also, if the overlap allowance of the diffusion plate and the liquid crystal display panel is reduced, then bright or dark lines caused by the side surface of the diffusion plate or other optical member will be visible on a display screen when the display screen is viewed from an oblique direction. If bright or dark lines caused by the side surface of the diffusion plate or other optical member are visible, then the display quality is degraded.

One object of this disclosure is to provide a display device capable of preventing a display quality of the display device from being deteriorated while preventing the display device from becoming defective even when a narrower frame is achieved.

In view of the state of the known technology and in accordance with a first aspect of the present invention, a display device comprises a light source, an optical member, a display cell and a guide member. The optical member is irradiated with light from the light source. The display cell is irradiated with the light passing through the optical member. The guide member has a first positioning section that positions the display cell and the optical member in a direction along a display surface of the display cell and a second positioning section that is formed integrally with the first positioning section and positions the display cell and the optical member in a thickness direction of the display cell. The first positioning section has a first side surface that is opposite a side surface of the display cell and a second side surface that is opposite a side surface of the optical member and is provided outside of the first side surface in the direction along the display surface of the display cell.

In view of the state of the known technology and in accordance with a second aspect of the present invention, a display device comprises a light source, an optical member, a display cell, a guide member, and a casing. The optical member is irradiated with light from the light source. The display cell is irradiated with the light passing through the optical member. The guide member includes a first positioning section that has a first side surface that is opposite a side surface of the display cell and a second side surface that is opposite a side surface of the optical member and is provided outside of the first side surface. The first positioning section positions the display cell and the optical member in a direction along a display surface of the display cell. The casing includes a front bezel that is disposed forward of the display cell and a rear frame that is disposed rearward of the optical member. Specifically, the front bezel can be provided on a front surface side of the display cell and the rear frame can be provided on a back side of the optical member, for example. The guide member has a first contact surface that contacts the front bezel and a second contact surface that contacts the rear frame in the thickness direction of the display cell.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

Referring to FIGS. 1 to 7, the configuration of a television device 100 according to a first embodiment will be described. The television device 100 is an example of a "display device" of the present disclosure.

Figure 1:
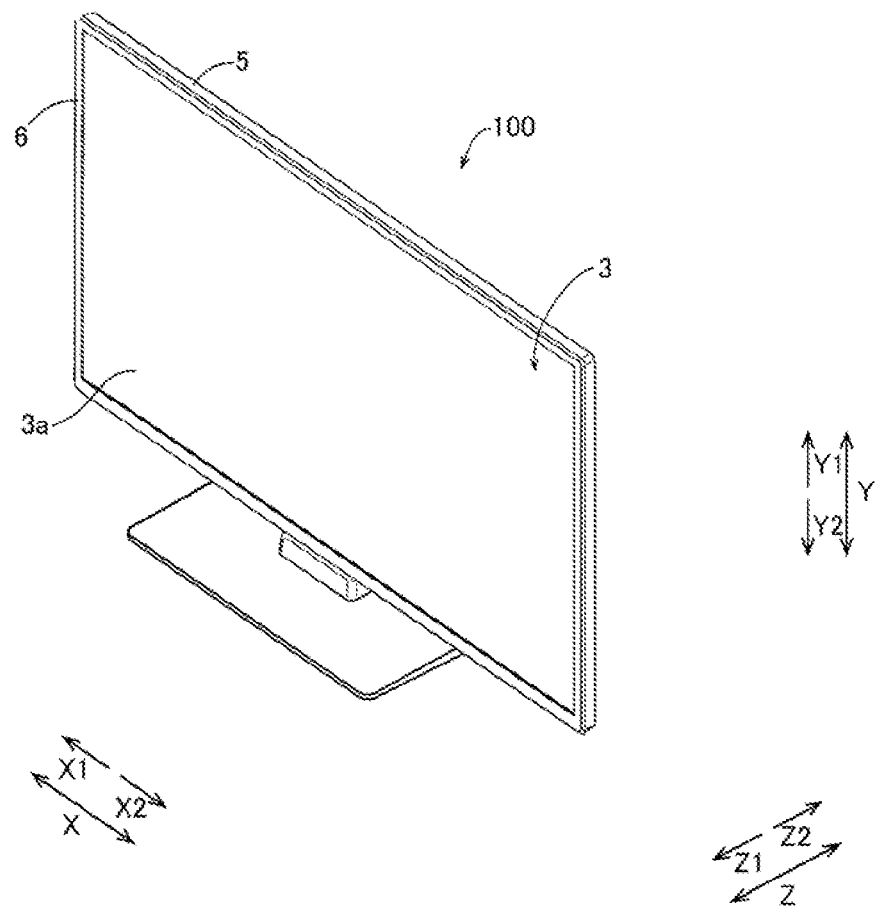
FIG. 1 is an overall front perspective view of a television device according to a first embodiment.
Figure 2:
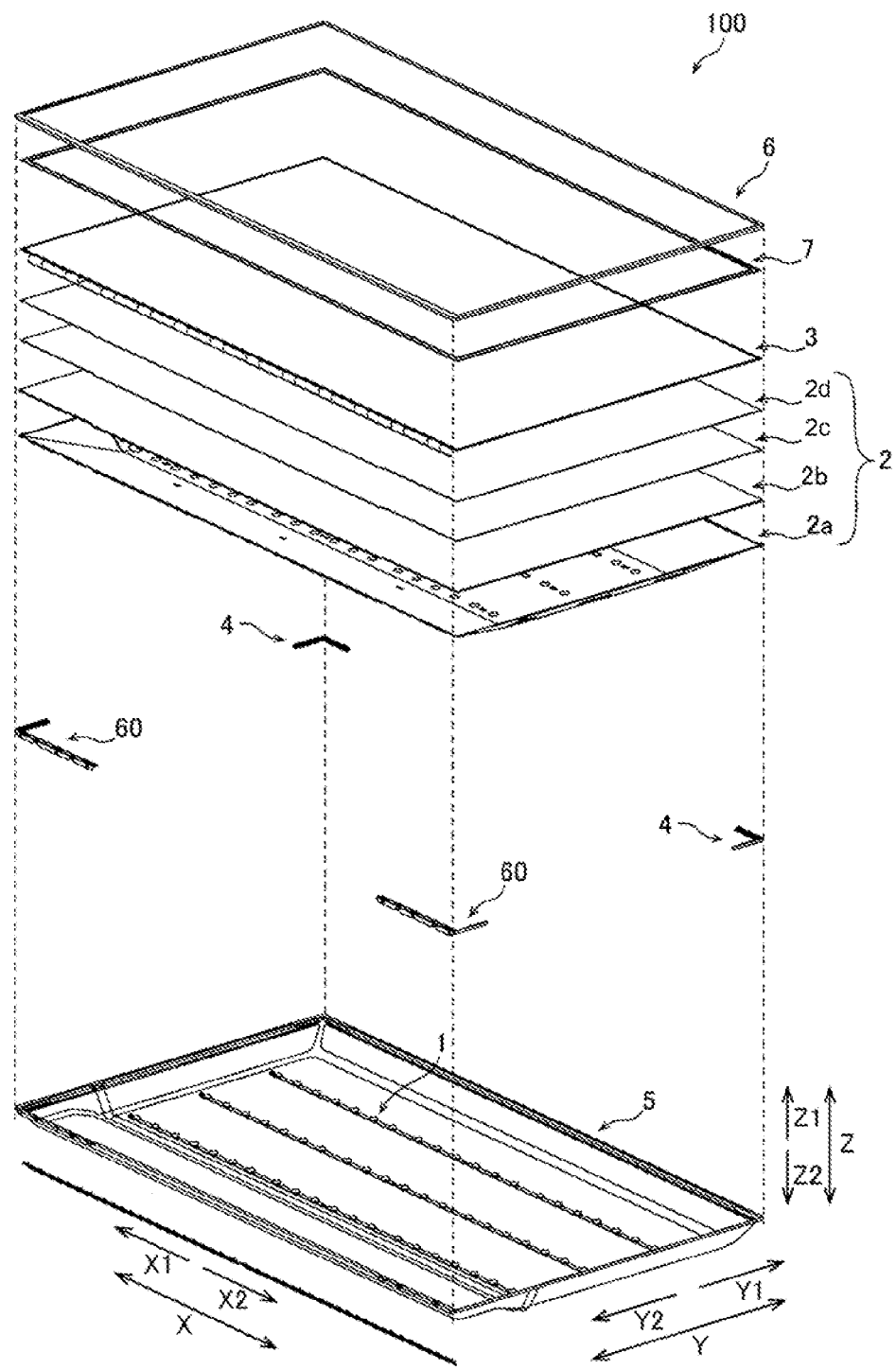
FIG. 2 is an exploded perspective view of the television device according to the first embodiment.

The television device 100 according to the first embodiment has a light source 1, an optical member 2, a display cell 3, at least one (two in FIG. 1) guide member 4, a casing, and a light shielding member 7, as shown in FIGS. 1 and 2.

Here, in this disclosure, the thickness direction of the display cell 3 is referred to as a Z direction. Also, of the Z direction, the direction directing from a rear or back side of the display cell 3 to a display surface 3a side (a front side) of the display cell 3 is a Z1 direction and the opposite direction thereof is the Z2 direction. In an imaginary plane perpendicular to the Z direction, the vertical direction is a Y direction, and the left and right direction or horizontal direction as viewed from the display surface 3a side of the display cell 3 are an X direction. In the Y direction, the upper direction is a Y1 direction and the lower direction is a Y2 direction. In the X direction, the left direction is an X1 direction and the right direction is an X 2 direction. Here, the Z direction is an example of the "thickness direction of the display cell" of the present disclosure. The X direction and the Y direction are examples of "the direction along the display surface of the display cell," "the direction perpendicular to the side surface of the display cell," and "the direction perpendicular to the side surface of the display cell and the side surface of the optical members" of the present disclosure.

The casing includes a rear frame 5 and a front bezel 6. The rear frame 5 is formed of a metal member. The rear frame 5 is provided on the back side (Z2 direction side) of the optical member 2. Specifically, the rear frame 5 is at least partially disposed rearward of the optical member 2 to entirely cover a rear surface of the optical member 2 from the rear of the optical member 2. The rear frame 5 forms a rear surface of the television device 100. The front bezel 6 is mounted around the display cell 3. The area of the display cell 3 inside the portion surrounded and covered by the front bezel 6 is the image display area. The front bezel 6 is formed of a resin or other material. Specifically, the front bezel 6 is formed as a rectangular frame that defines an opening through which the image display area of the display cell 3 is exposed. The front bezel 6 and the image display area of the display cell 3 form a front surface of the television device 100. In this embodiment, the inside means a direction along the display surface 3a of the display cell 3 and toward the center of the display cell 3. Also, the outside means a direction along the display surface 3a of the display cell 3 and away from the center of the display cell 3.

The light source 1 is provided to the rear frame 5. The light source 1 is configured to emit light toward the diffusion plate 2b. The light source 1 has a plurality of LEDs (light emitting diodes). The LEDs are arranged in a straight line in the longitudinal direction (X direction) of the display cell 3. The light source 1 in this embodiment is a so-called backlight type or direct type light source. More specifically, in the illustrated embodiment, as shown in FIG. 2, the light source 1 has a plurality of (three in FIG. 3) backlight strips each extending along the X direction on the rear frame 5. On each of the backlight strips, the LEDs are arranged in a straight line.

The optical member 2 is disposed between the display cell 3 and the rear frame 5 in the Z direction. The optical member 2 is formed in the shape of a rectangular flat plate as viewed from the Z direction. The optical member 2 is irradiated with the light from the light source 1. The optical member 2 includes a reflective sheet 2a, a diffusion plate 2b, an optical sheet 2c and an optical sheet 2d that are laminated in order from the rear frame 5 side. The reflective sheet 2a is laminated such that the outer peripheral portion thereof contacts the diffusion plate 2b. The optical sheet 2c is laminated on the front surface side (Z1 direction side) of the diffusion plate 2b such that the entire surface thereof contacts the diffusion plate 2b. The optical sheet 2d is laminated on the front surface side (Z1 direction side) of the optical sheet 2c such that the entire surface thereof contacts the optical sheet 2c.

The reflective sheet 2a is configured to reflect a portion of the light from the light source 1 toward the diffusion plate 2b. In the illustrated embodiment, the LEDs of the light source 1 are disposed through the holes of the reflective sheet 2a to irradiate the diffusion plate 2b with the light from the LEDs of the light source 1. Also, the reflective sheet 2a reflects the light from the LEDs of the light source 1 toward the diffusion plate 2b. The reflective sheet 2a is provided such that the distance between the reflective sheet 2a and the display cell 3 in the thickness direction (Z direction) of the display cell 3 increases as extending or approaching toward the center of the display cell 3. Specifically, the reflective sheet 2a is provided in an inclined manner such that the angle between the reflective sheet 2a and the diffusion plate 2b is an inclined angle θ1 (see FIG. 5). The inclined angle θ1 is the angle from the diffusion plate 2b to the direction of the rear frame 5 side (Z2 direction). In other words, the inclined angle θ1 is the angle between the rear surface of the diffusion plate 2b and the inclined surface of the reflective sheet 2a.

The diffusion plate 2b is formed of a resin or other material. The diffusion plate 2b is disposed between the reflective sheet 2a and the optical sheet 2c and is configured to diffuse the light from the light source 1.

The optical sheet 2c and optical sheet 2d are irradiated with the light diffused by the diffusion plate 2b. The optical sheet 2c and the optical sheet 2d are configured to adjust the direction of polarization of the light and to control the diffusion of the light, and to irradiate the display cell 3 with the light.

Figure 5:
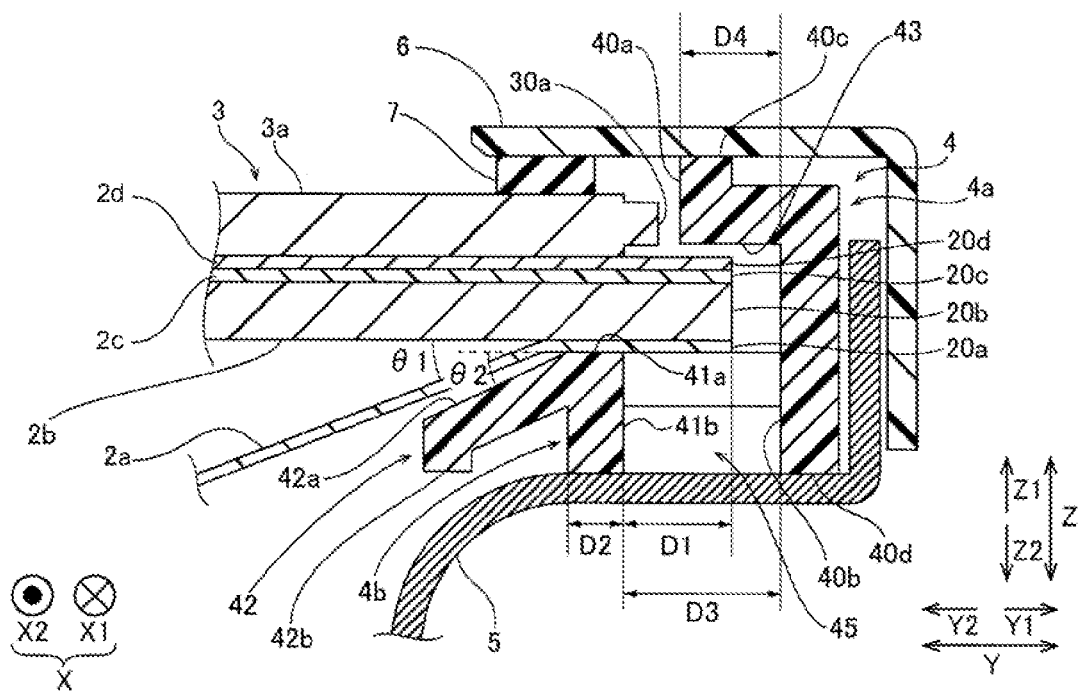
FIG. 5 is a cross-sectional view of the television device according to the first embodiment, taken along 600-600 line.

The display cell 3 is formed in the shape of a rectangular flat plate. The display cell 3 is formed such that it is smaller than the optical member 2 as viewed from the Z direction. Specifically, the display cell 3 has a smaller overall dimension than the optical member 2 in the X direction and has a smaller overall dimension than the optical member 2 in the Y direction. The display cell 3 is irradiated with the light passing through the optical member 2. Also, the display cell 3 is configured to display an image by changing the transmittance of the liquid crystal and the like relative to the light transmitted through the optical member 2. The display cell 3 includes, for example, a liquid crystal display cell. In the illustrated embodiment, the display cell 3 has side surfaces 30a. In the illustrated embodiment, as shown in FIG. 5, one side surface 30a is illustrated as a flat surface that is parallel to ZX plane. However, the side surface 30a can have different shape, such as a curved surface or a tapered surface. Furthermore, the display cell 3 also has another side surface 30a that is parallel to YZ plane.

The guide members 4 are configured to position the optical member 2 and the display cell 3. The guide members 4 are formed of a resin. In the illustrated embodiment, two guide members 4 are provided at at least two corners on the upper side (Y1 direction side) among the corners of the casing. The guide members 4 are independently formed as separate members. Each of the guide members 4 is integrally formed as a one-piece, unitary member. The guide members 4 are identical to each other, and thus, the detailed configuration of only one of the guide members 4 will be described below.

In the example shown in FIG. 2, two support guide members 60 are provided at two corners on the lower side (Y2 direction side) among the corners of the casing. The support guide members 60 are formed of a resin. The support guide members 60 are configured to position the optical member 2 and the display cell 3. The support guide members 60 are also configured to support the optical member 2 and the display cell 3. In the illustrated embodiment, the support guide members 60 are independently formed as separate members. Each of the support guide members 60 is integrally formed as a one-piece, unitary member.

In the example shown in FIG. 2, two guide members 4 are provided at two corners of the casing on the upper side (Y1 direction side) and two support guide members 60 are provided at two corners of the casing on the lower side (Y2 direction side).

The light shielding member 7 is disposed between the display cell 3 and the front bezel 6 in the Z direction. The light shielding member 7 is formed in a frame shape. The light shielding member 7 is provided to prevent the light emitted from the light source 1 from leaking out from between the display cell 3 and the front bezel 6. The light shielding member 7 is formed of a foam-based member. The light shielding member 7 includes, for example, polyethylene or polystyrene.

Figure 3:
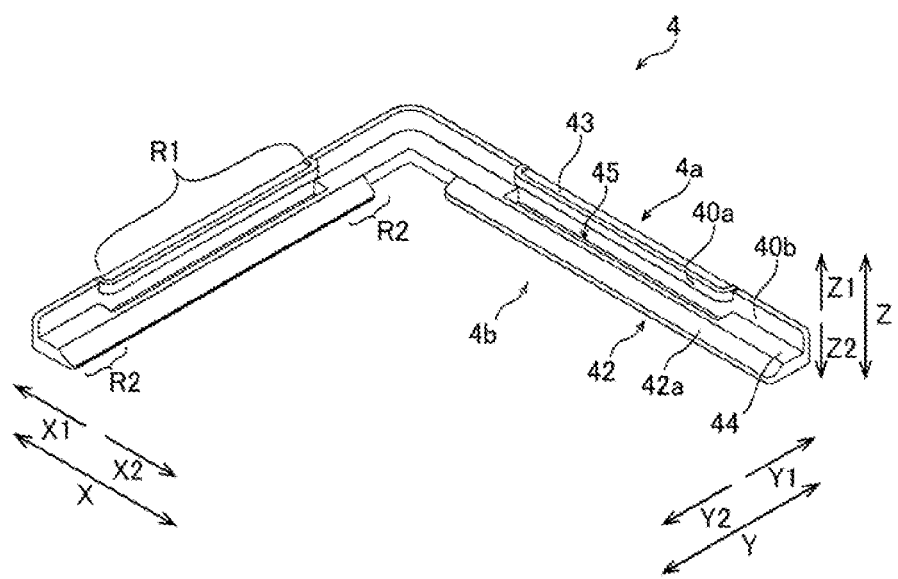
FIG. 3 is a perspective view showing a guide member according to the first embodiment.

As shown in FIG. 3, the guide member 4 is formed in an L-shape along the corners of the display cell 3 and the optical member 2. The guide member 4 includes a first positioning section 4a and a second positioning section 4b. The first positioning section 4a and the second positioning section 4b are provided on an edge of the guide member 4 that extends in the X direction. The first positioning section 4a and the second positioning section 4b are also provided on an edge of the guide member 4 that extends in the Y direction. Thus, in the illustrated embodiment, each of the guide members 4 has a pair of the first positioning sections 4a and a pair of the second positioning sections 4b.

The first positioning section 4a is configured to position the display cell 3 and the optical member 2 in a direction along the display surface 3a of the display cell 3. Specifically, the first positioning section 4a provided on the edge of the guide member 4 that extends in the X-direction is configured to position the display cell 3 and the optical member 2 in the Y-direction. Also, the first positioning section 4a provided on the edge of the guide member 4 that extends in the Y direction is configured to position the display cell 3 and the optical member 2 in the X direction. The first positioning section 4a has a first side surface 40a and a second side surface 40b. Also, the first positioning section 4a includes a first region R1 in which both the first side surface 40a and the second side surface 40b are provided, and a pair of second regions R2 in which the second side surface 40b is provided but the first side surface 40a is not provided. In particular, as shown in FIG. 3, for the first positioning section 4b that is provided on the edge of the guide member 4 that extends in the Y direction, the first region R1 is located between the pair of the second regions R2 in the Y direction, while for the first positioning section 4b that is provided on the edge of the guide member 4 that extends in the X direction, the first region R1 is located between the pair of the second regions R2 in the X direction.

The first side surface 40a is configured to position the display cell 3 in the direction along the display surface 3a of the display cell 3. The second side surface 40b is configured to position the optical member 2 in the direction along the display surface 3a of the display cell 3. The first side surface 40a and the second side surface 40b are connected by a first connection surface 43. In the illustrated embodiment, the first connection surface 43 extends in a direction perpendicular to the side surface 30a of the display cell 3 (see FIG. 5) and the side surface of the optical member 2 or in the direction along the display surface 3a of the display cell 3. The first connection surface 43 is the rear surface on the Z2 direction side of the portion connecting the first side surface 40a and the second side surface 40b. The detailed configuration of the first side surface 40a and the second side surface 40b will be described below.

The second positioning section 4b is formed integrally with the first positioning section 4a. The second positioning section 4b is configured to position the display cell 3 and the optical member 2 in the thickness direction (Z direction) of the display cell 3. The second positioning section 4b has an extension 42. The extension 42 has an inclined surface 42a. The detailed configuration of the extension 42 and the inclined surface 42a will be discussed below.

The first positioning section 4a and the second positioning section 4b are connected by a second connection surface 44. In the illustrated embodiment, the second connection surface 44 extends from the first positioning section 4a to the second positioning section 4b in the direction perpendicular to the side surface 30a of the display cell 3 and the side surface of the optical member 2 or in the direction along the display surface 3a of the display cell 3. That is, the second positioning section 4b is formed integrally with the first positioning section 4 by being connected to the first positioning section 4a by the second connection surface 44. In particular, in the illustrated embodiment, the guide member 4 has an intermediate section extending between the first positioning section 4a and the second positioning section 4b. The second connection surface 44 forms a front surface of the intermediate section.

In the first embodiment, as shown in FIG. 3, a hole 45 is provided in the first region R1 of the second connection surface 44 to penetrate the guide member 4 in the thickness direction (Z direction) of the display cell 3. Specifically, the hole 45 is provided to the intermediate section extending between the first positioning section 4a and the second positioning section 4b, and has an opening edge in the second connection surface 44. By providing the hole 45 in the second connection surface 44, for example, a resin molding mold for the first region R1 can be inserted through the hole 45 when the guide member 4 is manufactured with the resin molding mold. Therefore, the complexity of the structure of the resin molding mold used to manufacture the guide member 4 can be suppressed.

Referring now to FIGS. 4 to 7, the configuration of the television device 100 in a cross section of a position that includes the first region R1 of the guide member 4, the configuration of the television device 100 in a cross section of a position that includes the second region R2 of the guide member 4, and the configuration of the television device 100 in a cross section of a position that does not include the guide member 4 will be explained.

Figure 4:
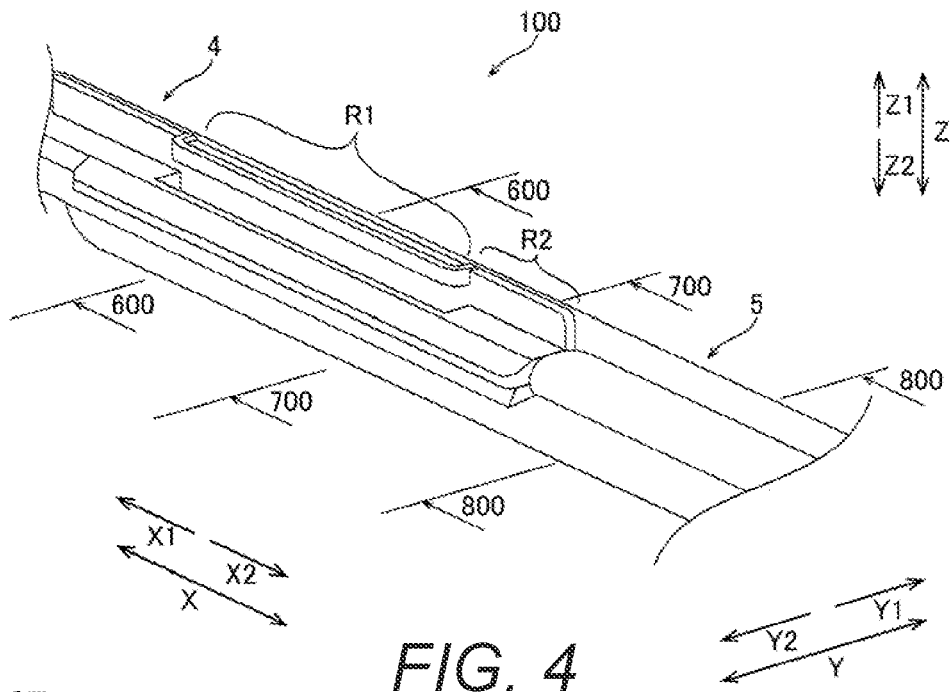
FIG. 4 is an enlarged view of a corner of a rear frame in a state in which a guide member of the television device according to the first embodiment is attached.

FIG. 4 is an enlarged perspective view of the guide member 4 attached to the rear frame 5, showing the edge extending in the X direction. Referring to a cross-sectional view taken along 600-600 line, a cross-sectional view taken along 700-700 line, and a cross-sectional view taken along the 800-800 line of FIG. 4, the configuration of the television device 100 in the cross section of the position that includes the first region R1 of the guide member 4, the configuration of the television device 100 in the cross section of the position that includes the second region R2 of the guide member 4, and the configuration of the television device 100 in the cross section of the position that does not include the guide member 4 will be explained. Here, the direction along the display surface 3a of the display cell 3 includes the X direction or the Y direction. In other words, when considering the first positioning section 4a and the second positioning section 4b provided on the edge of the guide member 4 extending in the X direction, the direction along the display surface 3a of the display cell 3 is the Y direction. When considering the first positioning section 4a and the second positioning section 4b provided on the edge of the guide member 4 extending in the Y direction, the direction along the display surface 3a of the display cell 3 is the X direction. The direction perpendicular to the side surface 30a of the display cell 3 is also the X direction or the Y direction, depending on the edges where the first positioning section 4a and the second positioning section 4b are provided.

Figure 6:
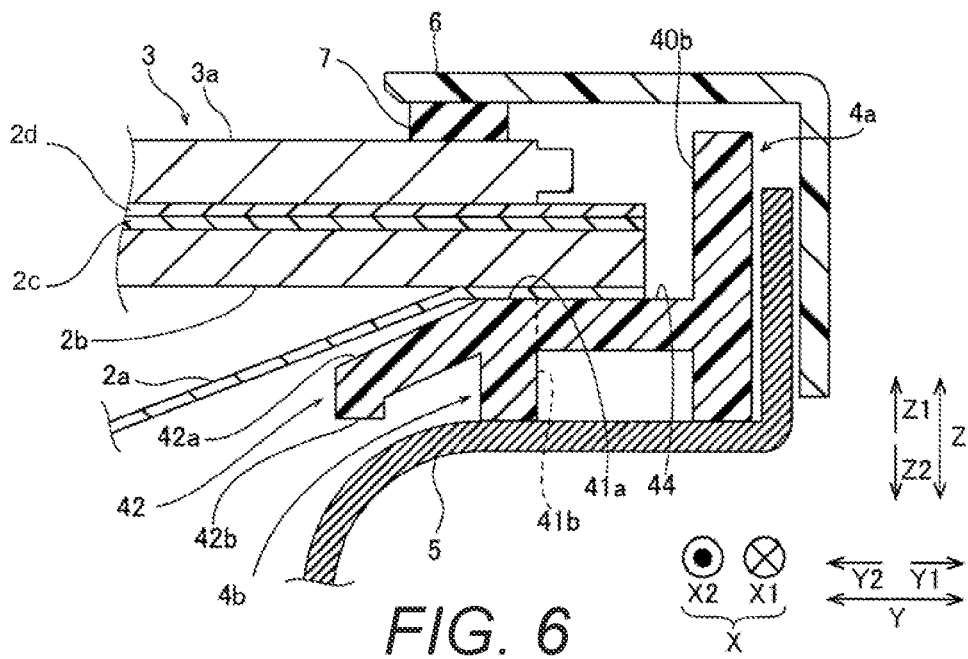
FIG. 6 is a cross-sectional view of the television device according to the first embodiment, taken along 700-700 line.
Figure 7:
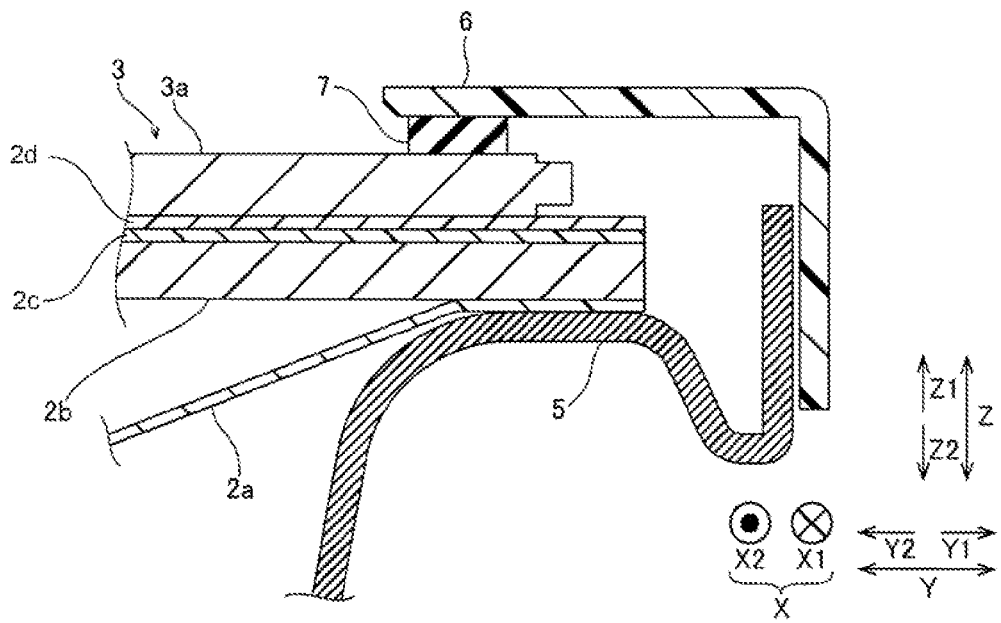
FIG. 7 is a cross-sectional view of the television device according to the first embodiment, taken along 800-800 line.

In FIGS. 5 to 7, the first positioning section 4a and the second positioning section 4b, which extend in the X direction, of the guide member 4 will be explained. Thus, in the following explanation, the direction along the display surface 3a of the display cell 3 will be described as the Y direction, as mentioned above. The direction perpendicular to the side surface 30a of the display cell 3 will also be described in FIGS. 5 to 7 as the Y direction. Of the guide member 4, the first positioning section 4a and the second positioning section 4b, which extend in the Y direction, of the guide member 4 have the same shape as the first positioning section 4a and the second positioning section 4b, which extend in the X direction, and thus the illustration and the explanation will be omitted for the sake of brevity.

Cross-sectional View at the Position Including the First Region of the Guide Member As shown in FIG. 5, the first side surface 40a is opposite the side surface 30a of the display cell 3. In the example shown in FIG. 5, the first side surface 40a is a surface along the X direction. The first side surface 40a is arranged relative to the display cell 3 with a gap between the first side surface 40a and the side surface 30a of the display cell 3. That is, the first side surface 40a is configured to position the display cell 3 in the direction along the display surface 3a of the display cell 3, with a margin for the manufacturing error in manufacturing the display cell 3 and for the tolerance in the assembly of the television device 100.

The second side surface 40b is opposite the side surface of the optical member 2. In the example shown in FIG. 5, the second side surface 40b is a surface along the X direction. That is, the second side surface 40b is opposite each of the side surface 20a of the reflective sheet 2a, the side surface 20b of the diffusion plate 2b, the side surface 20c of the optical sheet 2c, and the side surface 20d of the optical sheet 2d. Specifically, the second side surface 40b is provided at a position such that a distance from the second side surface 40b to the side surface 20a of the reflective sheet 2a, a distance from the second side surface 40b to the side surface 20b of the diffusion plate 2b, a distance from the second side surface 40b to the side surface 20c of the optical sheet 2c, and a distance from the second side surface 40b to the side surface 20d of the optical sheet 2d are all equal to each other. Specifically, in the illustrated embodiment, the outer peripheries of the reflective sheet 2a, the diffusion plate 2b, the optical sheet 2c and the optical sheet 2d have the same size and shape, and the positions of the side surfaces 20a, 20b, 20c and 20d in the Y direction (X direction) coincide with each other. Thus, the side surfaces 20a, 20b, 20c and 20d form the side surface of the optical member 2. In the illustrated embodiment, the side surfaces 20a, 20b, 20c and 20d are illustrated as a flat surface that is parallel to ZX plane. Of course, the side surfaces 20a, 20b, 20c and 20d can have different shape, such as a curved surface or tapered surface. Furthermore, the positions of the side surfaces 20a, 20b, 20c and 20d in the Y direction (or X direction) can be different from each other. Even in this case, in the illustrated embodiment, the side surfaces 20a, 20b, 20c and 20d can be collectively called as the side surface of the optical member 2. The second side surface 40b is provided outside of the first side surface 40a in the Y direction. In the example shown in FIG. 5, the second side surface 40b is arranged relative to the optical member 2 with a gap between the second side surface 40b and the side surface of the optical member 2. That is, the second side surface 40b is configured to position the optical member 2 in the direction along the display surface 3a of the display cell 3, with a margin for manufacturing error in manufacturing the optical member 2.

The side surface 20a of the reflective sheet 2a, the side surface 20b of the diffusion plate 2b, the side surface 20c of the optical sheet 2c, and the side surface 20d of the optical sheet 2d are disposed in the Y direction on the second side surface 40b side than the first side surface 40a. In other words, the side surface 20a of the reflective sheet 2a, the side surface 20b of the diffusion plate 2b, the side surface 20c of the optical sheet 2c, and the side surface 20d of the optical sheet 2d are positioned between the first side surface 40a and the second side surface 40b in the Y direction.

The first positioning section 4a has a first contact surface 40c that contacts the front bezel 6 and a second contact surface 40d that contacts the rear frame 5 in the Z direction. Specifically, as shown in FIG. 5, the rear frame 5 has an outer peripheral portion with a flat part. The guide member 4 is disposed on the flat part of the rear frame 5 such that the first positioning section 4a and the second positioning section 4b contact the inner or front surface of the flat part of the rear frame 5. Furthermore, the front bezel 6 has a front part. The guide member 4 is arranged relative to the front bezel 6 such that the first positioning section 4 contacts the inner or rear surface of the front part of the front bezel 6. That is, the guide member 4 is sandwiched between the front bezel 6 and the rear frame 5 such that the guide member 4 directly contacts the inner or front surface of the rear frame 5 and the inner or rear surface of the front bezel 6 in the thickness direction (Z direction) of the display cell 3. In the illustrated embodiment, the first contact surface 40c extends outward (in the Y1 direction in FIG. 5) from a front edge of the first side surface 40a, while the second contact surface 40d extends outward (in the Y1 direction in FIG. 5) from a rear edge of the second side surface 40b.

The second positioning section 4b is disposed closer to the center of the display cell 3 than the first positioning section 4a. The second positioning section 41b has a main support and the extension 42 that extends inward (Y2 direction) and rearward (Z2 direction) from the main support. The main support has an optical member contact surface 41a that contacts the optical member 2 in the thickness direction (Z direction) of the display cell 3. The second positioning section 4b is provided at a position between the optical member 2 and the rear frame 5. The optical member contact surface 41a contacts the optical member 2 from the rear frame 5 side (Z2 direction side). Specifically, the optical member contact surface 41a contacts the reflection sheet 2a from the rear frame 5 side (Z2 direction side). The optical member contact surface 41a forms a front surface of the main support of the second positioning section 4b that directly contacts the rear surface of the optical member 2 (the rear surface of the reflective sheet 2a). The main support of the second positioning section 4b also has a rear surface that directly contacts the front surface of the rear frame 5. Thus, the main support of the second positioning section 4b is sandwiched between the optical member 2 and the rear frame 5 to position the optical member 2 and the display cell 3 relative to the rear frame 5 in the thickness direction (Z direction) of the display cell 3. In particular, as shown in FIGS. 5 and 6, the main support of the second positioning section 4b is arranged such that both the optical member 2 and the display cell 3 overlap with the main support of the second positioning section 4b as viewed in the Z direction. In other words, the main support of the second is located directly below both the optical member 2 and the display cell 3. As also shown in FIG. 5, the main support of the second positioning section 4b has the thickness D2 in the Y direction. Thus, the optical member contact surface 41a is a front surface on the Z1 side of the second positioning section 4b that extends from an inner end portion of the main support of the second positioning section 4b (on the Y2 direction side) by the thickness D2 in the Y1 direction.

The second connection surface 44 of the intermediate section also contacts the reflection sheet 2a from the rear frame 5 side (Z2 direction side). That is, the optical member 2 and the display cell 3 in the Z direction are positioned by both the optical member contact surface 41a and the second connection surface 44. The second connection surface 44 is a front surface of the intermediate section that connects the first positioning section 4a and the second positioning section 4b and has a dimension or distance D3.

The light shielding member 7 is provided between the display cell 3 and the front bezel 6. That is, the light shielding member 7 has a function that prevents the light from leaking through the gap between the display cell 3 and the front bezel 6, and a function that positions the optical member 2 and the display cell 3 on the Z1 direction side.

The protrusion amount D1 of the side surface of the optical member 2 protruding toward the second side surface 40b from the surface 41b of the second positioning section 4b opposite the second side surface 40b is greater than the thickness D2 of the main support of the second positioning section 4b in the Y direction.

The second side surface 40b is disposed at a position such that the distance D3 from the surface 41b of the second positioning section 4b opposite the second side surface 40b to the second side surface 40b is greater than the distance D4 from the first side surface 40a to the second side surface 40b in the Y direction. That is, when resin-forming the guide member 4, the portion of the distance D4 including the first side surface 40a can be prevented from becoming a so-called undercut. The surface 41b of the second positioning section 4b opposite the second side surface 40b is the inner peripheral surface inside of the hole 45. In the example shown in FIG. 5, the surface 41b of the second positioning section 4b opposite the second side surface 40b is the inner peripheral surface of the hole 45 on the Y2 direction side. Furthermore, as shown in FIG. 5, the first connection surface 43 extends between the first side surface 40a and the second side surface 40b by the distance D4. In the illustrated embodiment, the distance D4 is dimensioned such that the sum of the protrusion amount D1 and the distance D4 is greater than the distance D3. Thus, in the illustrated embodiment, the first connection surface 43 is disposed directly opposite the front surface of the optical member 2 (the optical sheet 20d) in the Z direction. In other words, the first connection surface 43 is arranged to overlap with the optical member 2 as viewed in the Z direction. However, the distance D4 can also be dimensioned such that the first connection surface 43 does not overlap with the optical member 2 as viewed in the Z direction.

As shown in FIG. 5, the extension 42 has an inclined surface 42a and a protruding portion 42b. The extension 42 is provided at a position between the reflective sheet 2a and the rear frame 5. The extension 42 is formed so as to extend along the reflective sheet 2a.

The extension 42 has the inclined surface 42a that extends along the reflective sheet 2a. The inclined surface 42a has a flat plate shape extending along the reflective sheet 2a. The inclined surface 42a is provided to prevent the reflective sheet 2a from warping beyond a predetermined angle. The inclined surface 42a is inclined at an angle of an inclination angle $\theta2$. The inclination angle $\theta2$ is an angle from the diffusion plate 2b to the direction of the rear frame 5 side. In other words, the inclination angle $\theta2$ is the angle between the rear surface of the diffusion plate 2b and the inclined surface 42a of the extension 42. The inclination angle θ2 is an angle equal to or greater than the inclination angle θ1 of the reflective sheet 2a. The example shown in FIG. 5 is illustrated at an angle substantially equal to the inclination angle θ1.

The protruding portion 42b protrudes from the end portion of the inclined surface 42a on the Z2 direction side in the Z2 direction. By providing the protruding portion 42b, the cross-sectional area of the cross section of the second positioning section 4b taken along the 600-600 line can be increased, thereby increasing the mechanical strength of the second positioning section 4b.

The display cell 3 is provided on the front surface side (Z1 direction side) of the optical member 2 such that the display cell 3 contacts the optical member 2. Specifically, the display cell 3 is provided directly in contact with the optical sheet 2d. That is, in this embodiment, the optical member 2 and the display cell 3 are laminated (directly laminated) in contact with each other.

Cross-sectional View of the Position Including the Second Region of the Guide Member As shown in FIG. 6, in the second region R2 of the guide member 4, the first positioning section 4a is not provided with the first side surface 40a, but is only provided with the second side surface 40b. In the second region R2 of the guide member 4, there is no hole 45 in the second connection surface 44. Thus, a cross-sectional view of the second region R2 of the guide member 4 taken along the 700-700 line is a cross section that includes the second connection surface 44, and in which the first positioning section 4a and the second positioning section 4b are connected.

Cross-sectional View of the Position that does not Include the Guide Member

As shown in FIG. 7, in the position not including the guide member 4, the rear frame 5 has a curved shape so as to contact the optical member 2. Specifically, in the cross section taken along the 800-800 line, the Z-direction position of the surface where the rear frame 5 contacts the optical member 2 coincides with the Z-direction position of the second positioning section 4b in cross section taken along the 700-700 line and the cross section taken along the 600-600 line. In other words, a recess that is depressed by the thickness of the second positioning section 4b in the Z direction is formed in the rear frame 5 where the guide member 4 is installed. With this configuration, the optical member 2 and the display cell 3 is positioned by the rear frame 5.

Effect of the First Embodiment

In the first embodiment, the following effects can be achieved.

In the first embodiment, as described above, the television device 100 comprises the light source 1, the optical member 2, the display cell 3, and the guide member 4. The optical member 2 is irradiated with the light from the light source 1. The display cell 3 is irradiated with the light passing through the optical member 2. The guide member 4 has the first positioning section 4a that positions the display cell 3 and the optical member 2 in the direction along the display surface 3a of the display cell 3, and the second positioning section 4b that is formed integrally with the first positioning section 4a and positions the display cell 3 and the optical member 2 in the thickness direction of the display cell 3. The first positioning section 4a has the first side surface 40a that is opposite the side surface 30a of the display cell 3 and the second side surface 40b that is opposite the side surface of the optical member 2 and is provided outside of the first side surface 40a in the direction along the display surface 3a of the display cell 3. With this configuration, the second side surface 40b that is opposite the side surface of the optical member 2 is provided outside of the first side surface 40a that is opposite the side surface 30a of the display cell 3, and thus the side surface of the optical member 2 can be positioned more outward, compared to a configuration in which the first side surface 40a and the second side surface 40b are provided at the same position. Therefore, when the optical member 2 is placed on the guide member 4, the length of the portion in which the optical member 2 and the guide member 4 contact each other can be increased, and thus the overlap allowance of the optical member 2 can be increased. Therefore, even if the optical member 2 is displaced during transportation, the optical member 2 and the display cell 3 can be prevented from falling out of the guide member 4. Also, since the side surface of the optical member 2 can be positioned more outwardly, even if bright or dark lines are caused by the side surface of the optical member 2, the side surface of the optical member 2 can be positioned at a position where the bright or dark lines are not visible on the display screen. As a result, the display quality of the television device 100 can be prevented from being deteriorated while preventing the television device 100 from becoming defective even when a narrower frame is achieved.

In the first embodiment, as described above, the side surface of the optical member 2 is disposed on the second side surface 40b side than the first side surface 40a in the direction along the display surface 3a of the display cell 3. With this configuration, the side surface of the optical member 2 can be placed more outward, compared to a configuration in which the side surface of the optical member 2 is disposed at a position approximately equal to the first side surface 40a or more inward than the first side surface 40a. Therefore, when the optical member 2 is placed on the guide member 4, the length of the portion in which the optical member 2 and the guide member 4 contact each other can be increased, and thus the overlap allowance of the optical member 2 can be increased. Therefore, the optical member 2 and the display cell 3 can be placed more stably. In addition, since the overlap allowance of the optical member 2 can be increased, it is possible to further prevent the display cell 3 and the optical member 2 from falling out due to displacement of the display cell 3 and the optical member 2 during transportation, and to further prevent bright or dark lines caused by the side surface of the optical member 2 from being visible on the display screen. As a result, the display quality of the television device 100 can be further prevented from being deteriorated while further preventing the television device 100 from becoming defective.

In the first embodiment, as described above, the protrusion amount D1 of the side surface of the optical member 2 protruding toward the second side surface 40b from the surface 41b of the second positioning section 4b opposite the second side surface 40b is greater than the thickness D2 of the second positioning section 4b in the direction perpendicular to the side surface 30a of the display cell 3. Here, the overlap allowance of the optical member 2 is the length, in the direction perpendicular to the side surface 30a of the display cell 3, of the portion in which the optical member 2 and the guide member 4 contact each other. In other words, the overlap allowance of the optical member 2 is the total length of the protrusion amount D1 of the side surface of the optical member 2 protruding toward the second side surface 40b and the thickness D2 of the second positioning section 4b in the direction perpendicular to the side surface 30a of the display cell 3. Therefore, if the protrusion amount D1 of the side surface of the optical member 2 protruding toward the second side surface 40b is configured to be greater than the thickness D2 of the second positioning section 4b in the direction perpendicular to the side surface 30a of the display cell 3, the overlap allowance of the optical member 2, which is the length of the portion in which the optical member 2 and the guide member 4 contact each other, can be at least twice the thickness D2 of the second positioning section 4b in the direction perpendicular to the side surface 30a of the display cell 3, and thus the overlap allowance of the optical member 2 can be easily increased. As a result, the display quality of the television device 100 can be easily prevented from being deteriorated.

In the first embodiment, as described above, the second side surface 40b is disposed at a position where the distance D3 from the surface face 41b of the second positioning section 4b opposite the second side surface 40b to the second side surface 40b is greater than the distance D4 from the first side surface 40a to the second side surface 40b in the direction along the display surface 3a of the display cell 3. With this configuration, for example, when the guide member 4 is manufactured with the resin molding mold, the surface 41b of the second positioning section 4b opposite the second side surface 40b is disposed inward than the first side surface 40a, and thus it is possible to prevent the second side surface 40b from interfering with the resin molding mold corresponding to the first side surface 40a when releasing the resin molding mold corresponding to the first side surface 40a. Therefore, when the guide member 4 is manufactured with the resin molding mold, the resin molding mold can be easily released. As a result, the guide member 4 in which the second side surface 40b is disposed outside of the first side surface 40a can be easily manufactured.

In the first embodiment, as described above, the television device 100 comprises the casing including the rear frame 5 provided on the back side of the optical member 2. The second positioning section 4b has the optical member contact surface 41a that contacts the optical member 2 in the thickness direction of the display cell 3. The second positioning section 4b is provided at a position between the optical member 2 and the rear frame 5. The optical member contact surface 41a contacts the optical member 2 from the rear frame 5 side. With this configuration, the optical member 2 can be prevented from directly contacting the rear frame 5. As a result, scratches or other damage on the optical member 2 caused by the optical member 2 contacting the rear frame 5 during assembly can be prevented.

In the first embodiment, as described above, the optical member 2 includes the reflective sheet 2a, the diffusion plate 2b, and the optical sheet 2c and the optical sheet 2d that are laminated in order from the rear frame 5 side. The reflective sheet 2a, the diffusion plate 2b, and the optical sheet 2c and the optical sheet 2d are arranged such that each side surface thereof is opposite the second side surface 40b. With this configuration, by arranging each side surface of the reflective sheet 2a, the diffusion plate 2b, and the optical sheet 2c and the optical sheet 2d so as to be opposite the second side surface 40b, the overlap allowance of the optical member 2 can be securely ensured.

In the first embodiment, as described above, the optical member contact surface 41a contacts the reflective sheet 2a. The reflective sheet 2a is provided such that the distance between the reflective sheet 2a and the display cell 3 in the thickness direction of the display cell 3 increases as extending toward the center of the display cell 3. The second positioning section 4b has the extension 42 extending along the reflective sheet 2a at a position between the reflective sheet 2a and the rear frame 5. With this configuration, since the extension 42 extends along the reflective sheet 2a, for example, even when a shock is applied to the reflective sheet 2a, the deflection or warping of the reflective sheet 2a can be prevented by the extension 42. In addition, compared to a configuration in which the extension 42 is not provided in the second positioning section 4b, the optical member 2 can be more prevented from falling out of the guide member 4. As a result, the display quality of the television device 100 can be further prevented from being deteriorated while further preventing the television device 100 from becoming defective.

In the first embodiment, as described above, the extension 42 has the inclined surface 42a extending along the reflective sheet 2a. With this configuration, the deflection or warping of the portion in which the reflective sheet 2a is arranged at an angle can be easily prevented by the inclined surface 42a.

In the first embodiment, as described above, the guide member 4 is formed in an L-shape along the corners of the display cell 3 and the optical member 2, and is provided in at least two upper corners of the corners of the casing. With this configuration, for example, the size of the guide member 4 can be reduced, compared to a configuration in which the guide member 4 is formed in a frame shape, and thus handling during assembly can be easily ensured. In addition, unlike the configuration in which the guide member 4 is formed in the frame shape, it can also be applied to an edge-lit type television device, and thus the degree of freedom in selecting the light source 1 can be improved.

In the first embodiment, as described above, the casing further includes the front bezel 6 provided on the front surface side of the display cell 3. The guide member 4 has the first contact surface 40c that contacts the front bezel 6 and the second contact surface 40d that contacts the rear frame 5 in the thickness direction of the display cell 3. With this configuration, since the guide member 4 contacts both the front bezel 6 and the rear frame 5, the guide member 4 can be stably disposed, compared to a configuration in which the guide member 4 contacts only one of the front bezel 6 and the rear frame 5. As a result, the optical member 2 and the display cell 3 can be stably disposed.

In the first embodiment, as described above, the first positioning section 4a includes the first region R1 in which both the first side surface 40a and the second side surface 40b are provided, and the second region R2 in which the second side surface 40b is provided and in which the first side surface 40a is not provided. The first positioning section 4a and the second positioning section 4b are connected by the second connection surface 44 extending in the direction perpendicular to the side surface 30a of the display cell 3 and the side surface of the optical member 2. With this configuration, the first positioning section 4a and the second positioning section 4b are connected by the second connection surface 44, and thus the guide member 4 can be easily formed as one piece.

In the first embodiment, as described above, the display cell 3 is provided on the front surface side of the optical member 2 in contact with the optical member 2. With this configuration, it is possible to prevent an increase in the size of the television device 100 in the thickness direction, compared to a configuration in which the display cell 3 is provided without being in contact with the optical member 2. As a result, the television device 100 can be made thinner.

Second Embodiment

Next, referring to FIG. 8, a second embodiment will be described. With a guide member 14 provided by a television device 200 of this second embodiment, a connection or corner portion 40e between the first connection surface 43 and the first side surface 40a is chamfered. The same sign is used for the same part as in the first embodiment, and the detailed description will be omitted for the sake of brevity.

Figure 8:
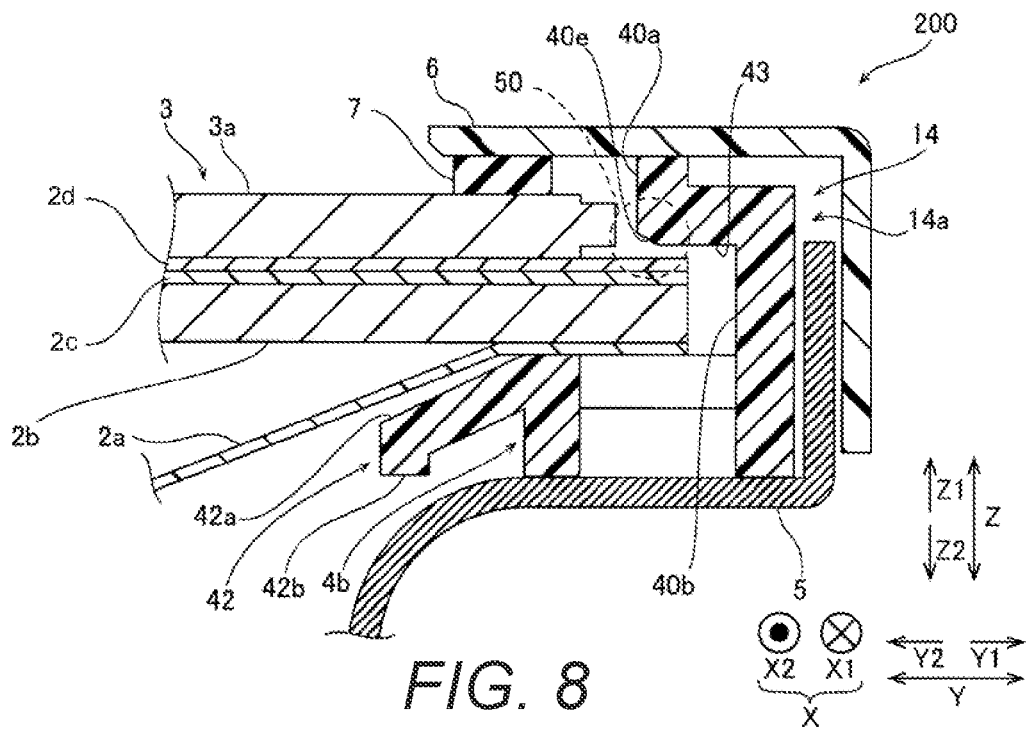
FIG. 8 is a cross-sectional view of a television device according to a second embodiment, taken along the 600-600 line.

As shown in FIG. 8, the television device 200 according to the second embodiment differs from the television device 100 according to the first embodiment above in that the guide member 14 is provided instead of the guide member 4. The guide member 14 according to the second embodiment includes a first positioning section 14a and the second positioning section 4b. The first positioning section 14a has the first side surface 40a and the second side surface 40b. The first side surface 40a and the second side surface 40b are connected by the first connection surface 43. The connection portion 40e between the first connection surface 43 and the first side surface 40a is chamfered. In the example shown in FIG. 8, at a position encircled by a circle 50, the connection portion 40e between the first connection surface 43 and the first side surface 40a is C-chamfered. Since the second positioning section 4b has the same configuration as the first embodiment above, the detailed description of the second positioning section 4b will be omitted for the sake of brevity.

The other configurations of the second embodiment are the same as the first embodiment above.

Effect of the Second Embodiment

In the second embodiment, the following effects can be achieved.

In the second embodiment, as described above, the first side surface 40a and the second side surface 40b are connected by the first connection surface 43 extending in the direction perpendicular to the side surface 30a of the display cell 3 and the side surface of the optical member 2. The connection portion 40e between the first connection surface 43 and the first side surface 40a is chamfered. With this configuration, the optical member 2 and the display cell 3 can be prevented from being caught in the connection portion 40e when attaching the optical member 2 and the display cell 3 to the guide member 4, compared to a configuration in which the connection portion 40e is not chamfered. As a result, the optical member 2 and the display cell 3 can be easily assembled.

Other effects of the second embodiment are the same as in the first embodiment above.

Third Embodiment

Next, referring to FIG. 9, a third embodiment will be described. With this third embodiment, one of the optical member 2 and a first positioning section 24a provided by a television device 300 of this third embodiment has an engaging portion 46a, and the other one of the optical member 2 and the first positioning section 24a has an engaged portion 47a that engages with the engaging portion 46a. The same sign is used for the same part as in the first embodiment, and the detailed description will be omitted for the sake of brevity.

Figure 9:
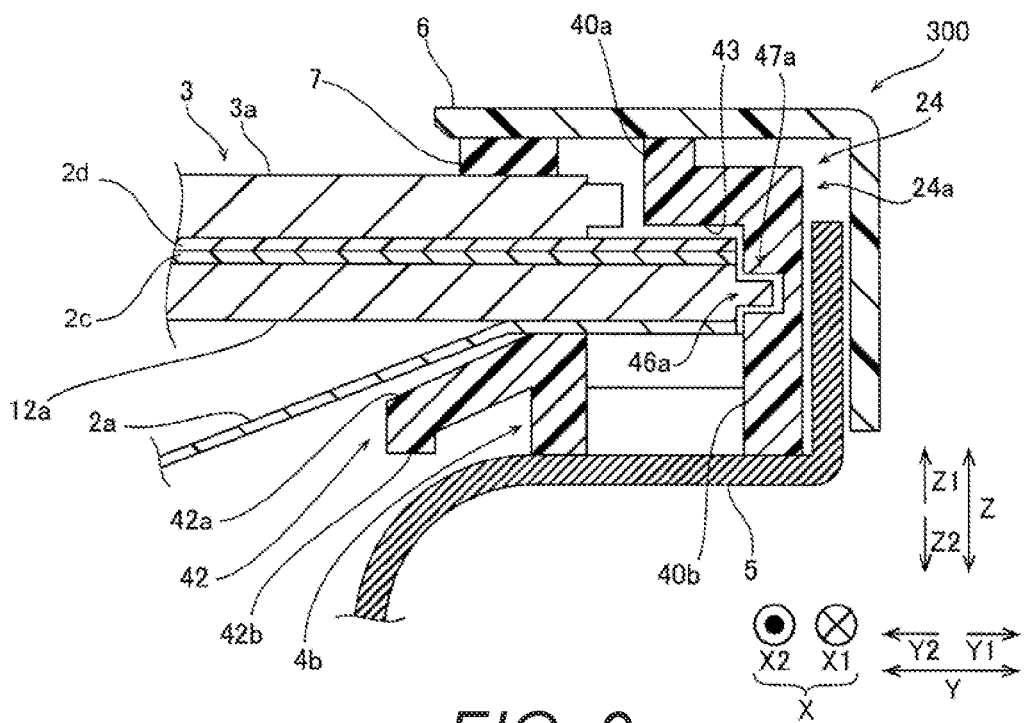
FIG. 9 is a cross-sectional view of a television device according to a third embodiment, taken along the 600-600 line.

As shown in FIG. 9, the television device 300 of the third embodiment differs from the television device 100 according to the first embodiment above in that a diffusion plate 12a and a guide member 24 are provided instead of the diffusion plate 2b and the guide member 4.

In the third embodiment, the engaging portion 46a is provided on a side surface of the diffusion plate 12a on the Y1 direction side. As shown in FIG. 9, the engaging portion 46a of the third embodiment has a shape protruding from the side surface of the diffusion plate 12a on the Y1 direction side toward the second side surface 40b. Specifically, the engaging portion 46a has a protrusion that extends along the side surface of the diffusion plate 12a in the X direction. In the illustrated embodiment, the engaging portion 46a has the thickness in the Z direction that is smaller than the thickness of the diffusion plate 12a in the Z direction. As also shown in FIG. 9, the engaging portion 46a protrudes in the Y1 direction with respect to the side surfaces of the reflective sheet 2a, the optical sheet 2c and the optical sheet 2d.

The guide member 24 of the third embodiment includes the first positioning section 24a and the second positioning section 4b. The first positioning section 24a includes the first side surface 40a and the second side surface 40b. The first side surface 40a and the second side surface 40b are connected by the first connection surface 43. As shown in FIG. 9, the second side surface 40b of the third embodiment is provided with the engaged portion 47a. The engaged portion 47a is provided at a position to engage with the engaging portion 46a. The engaged portion 47a has a concave shape. Specifically, the engaged portion 47a has a recess or groove that extends along the X direction on the second side surface 40b. The engaged portion 47a is dimensioned to receive the engaging portion 46a. In particular, the engaged portion 47a has the width in the Z direction that is greater than the thickness of the engaging portion 46a in the Z direction. The engaged portion 47a can be a through hole that penetrates the second side surface 40b in the Y direction.

The diffusion plate 12a and the second side surface 40b are engaged with each other by inserting the engaging portion 46a provided in the diffusion plate 12a into the engaged portion 47a provided in the second side surface 40b. With this configuration, the optical member 2 and the guide member 24 can be engaged with each other. Here, in the illustrated embodiment, when the engaging portion 46a is engaged with the engaged portion 47a, the engaging portion 46a can be fitted into the engaged portion 47a such that the engaging portion 46a contacts the engaged portion 47a or can be inserted into the engaged portion 47a with a clearance or gap therebetween.

In the example shown in FIG. 9, the first positioning section 24a of the guide member 24, which is provided on an edge along the X direction, and the side surface of the diffusion plate 12a opposite the second side surface 40b along the X direction are described. Thus, the engaging portion 46a has a shape protruding from the side surface of the diffusion plate 12a on the Y1 direction side toward the second side surface 40b, and the engaged portion 47a is provided that engages with the engaging portion 46a of the second side surface 40b. For the first positioning section 24a of the guide member 24, which is provided on an edge along the Y direction, the engaging portion 46a has a shape protruding from the side surface of the diffusion plate 12a in the X1 direction (or X2 direction) toward the second side surface 40b along the Y direction. The engaged portion 47a is also provided at a position to engage with the engaging portion 46a of the second side surface 40b along the Y direction.

The other configurations of the third embodiment are the same as the first embodiment above.

Effect of the Third Embodiment

In the third embodiment, the following effects can be achieved.

In the third embodiment, as described above, the diffusion plate 12a is provided with the engaging portion 46a. The second side surface 40b is provided with the engaged portion 47a that engages with the engaging portion 46a. With this configuration, the optical member 2 can be fixed to the first positioning section 4a by the engaging portion 46a and the engaged portion 47a. As a result, the optical member 2 can be reliably prevented from falling out of the guide member 4 during transportation and the like.

Other effects of the third embodiment are the same as in the first embodiment above.

Fourth Embodiment

Next, referring to FIG. 10, a fourth embodiment will be described. With a television device 400 of this fourth embodiment, in addition to the configuration of the television device 100 in the first embodiment, a first elastic member 8 is further provided. The same sign is used for the same part as in the first embodiment, and the detailed description will be omitted for the sake of brevity.

Figure 10:
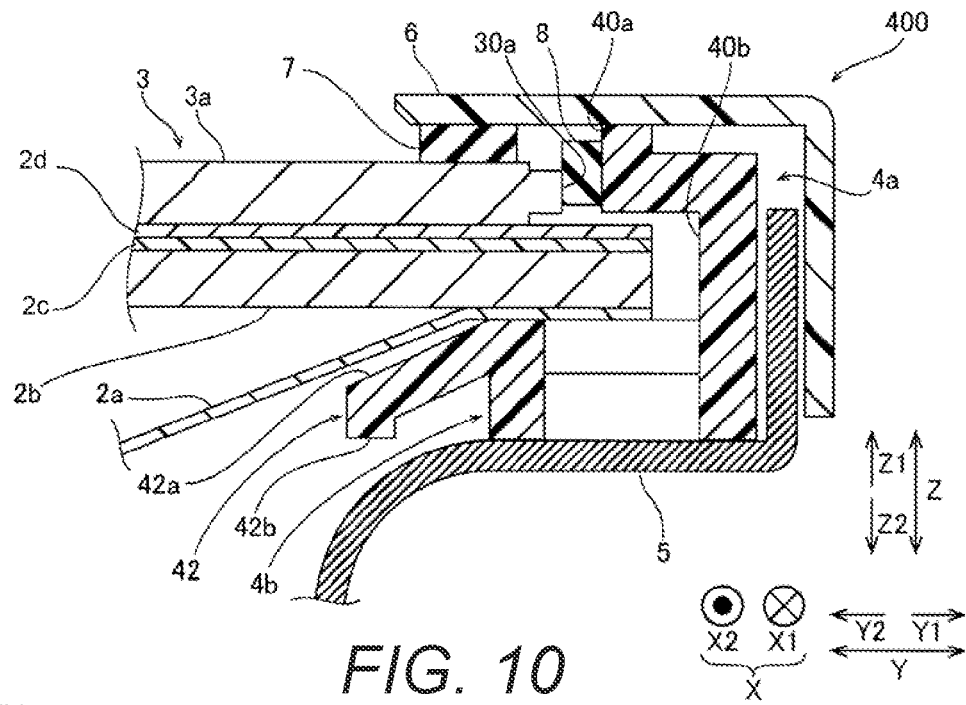
FIG. 10 is a cross-sectional view of a television device according to a fourth embodiment, taken along the 600-600 line.

As shown in FIG. 10, the television device 400 of the fourth embodiment has the first elastic member 8 provided between the side surface 30a of the display cell 3 and the first side surface 40a. The first elastic member 8 has an end surface on one side (Y2 direction side) that contacts the side surface 30a of the display cell 3 and an end surface on the other side (Y1 direction side) that contacts the first side surface 40a.

The first elastic member 8 is formed of a member with high abrasion resistance. The first elastic member 8 is formed of, for example, an elastomer. The elastomer includes, for example, silicone-based resin.

The other configurations of the fourth embodiment are the same as the first embodiment above.

Effect of the Fourth Embodiment

In the fourth embodiment, the following effects can be achieved.

In the fourth embodiment, as described above, the television device 400 comprises the first elastic member 8 provided between the side surface 30a of the display cell 3 and the first side surface 40a. The first elastic member 8 has the end surface on one side that contacts the side surface 30a of the display cell 3 and the end surface on the other side that contacts the first side surface 40a. With this configuration, the position of the display cell 3 can be fixed by the first elastic member 8. As a result, the display cell 3 can be reliably prevented from falling out of the guide member 4.

Other effects of the fourth embodiment are the same as in the first embodiment above.

Fifth Embodiment

Next, referring to FIG. 11, a television device 500 of a fifth embodiment will be described. In this fifth embodiment, in addition to the configuration of the television device 100 in the first embodiment, a second elastic member 9 is further provided. The same sign is used for the same part as in the first embodiment, and the detailed description will be omitted for the sake of brevity.

Figure 11:
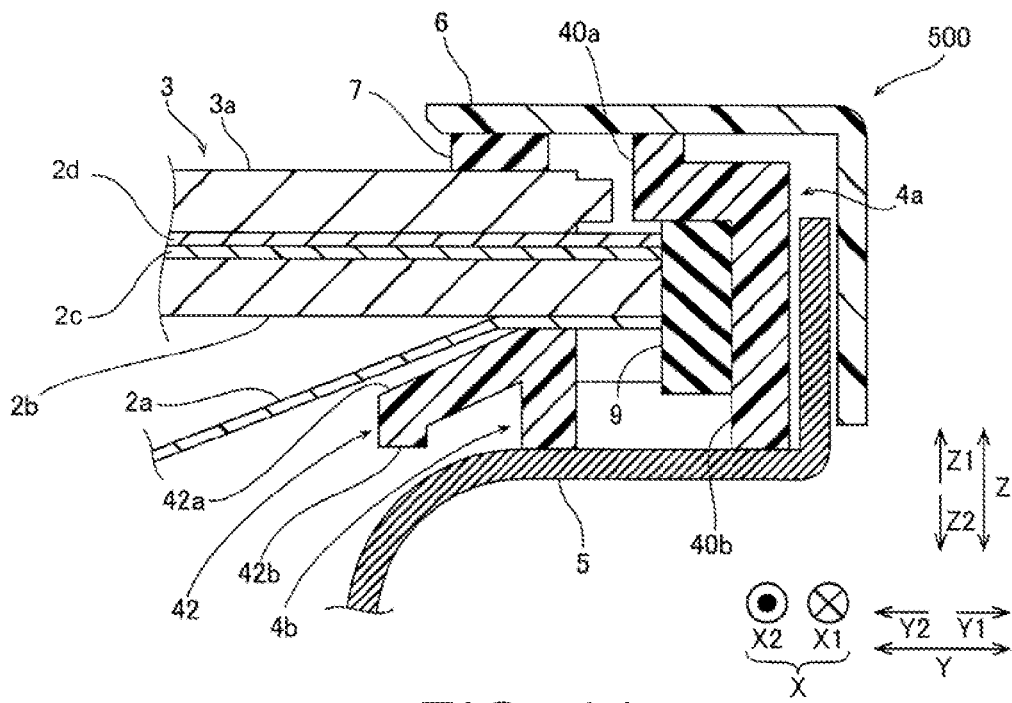
FIG. 11 is a cross-sectional view of a television device according to a fifth embodiment, taken along the 600-600 line.

As shown in FIG. 11, the television device 500 of the fifth embodiment has the second elastic member 9 provided between the side surface of the optical member 2 and the second side surface 40b. The second elastic member 9 has an end surface on one side (Y2 direction side) that contacts the side surface of the optical member 2 and an end surface on the other side (Y1 direction side) that contacts the second side surface 40b.

The second elastic member 9 is formed of a member with high abrasion resistance. The second elastic member 9 is formed of, for example, an elastomer. The elastomer includes, for example, silicone-based resin.

In the illustrated embodiment, as shown in FIG. 11, the television device 500 of the fifth embodiment only has the second elastic member 9, but does not have the first elastic member 8 of the fourth embodiment shown in FIG. 10. However, the television device 500 can be configured to have both the first elastic member 8 between the side surface between the side surface 30a of the display cell 3 and the first side surface 40a and the second elastic member 9 between the side surface of the optical member 2 and the second side surface 40b.

The other configurations of the fifth embodiment are the same as the first embodiment above.

Effect of the Fifth Embodiment

In the fifth embodiment, the following effects can be achieved.

In the fifth embodiment, as described above, the television device 500 comprises the second elastic member 9 provided between the side surface of the optical member 2 and the second side surface 40b. The second elastic member 9 has the end surface on one side that contacts the side surface of the optical member 2 and the end surface on the other side that contacts the second side surface 40b. With this configuration the position of the optical member 2 can be fixed by the second elastic member 9. As a result, the optical member 2 can be reliably prevented from falling out of the guide member 4.

Other effects of the fifth embodiment are the same as in the first embodiment above.

MODIFICATION EXAMPLES

The embodiments disclosed here are illustrative and are not restrictive in all respects. The scope of the invention is indicated by the claims rather than by the description of the embodiments described above, and furthermore includes all modifications (modification examples) within the meaning and scope of the claims and their equivalent.

For example, in the first to fifth embodiments above, examples in which the present invention is applied to a television device are shown, but the present invention can be applied to a display device other than the television device.

Figure 12:
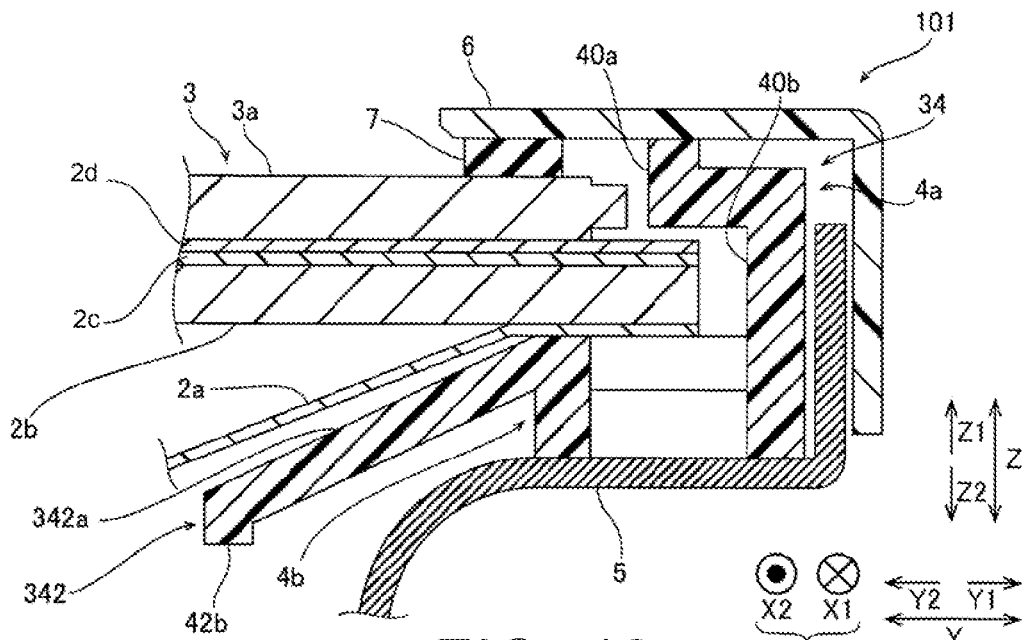
FIG. 12 is a cross-sectional view of a television device according to a first modification example of the first embodiment, taken along the 600-600 line.

In the first embodiment above, an example of the configuration in which the extension 42 does not extend further in the Z2 direction side than the second contact surface 40d is shown, but the present invention is not limited to this. For example, as in a television device 101 of a first modification example of the first embodiment shown in FIG. 12, an extension 342 can be configured to extend in the Z2 direction side than the second contact surface 40d. Specifically, as shown in FIG. 12, the extension 342 is provided to a second positioning section 34a of a guide member 34, and the extension 342 extends in the Z2 direction side than the second contact surface 40d. With this configuration, compared to a configuration in which the extension 42 does not extend in the Z2 direction side than the second contact surface 40d, an inclined surface 342a of the extension 342 can be made longer, and thus an area in which the deflection or warping of the reflective sheet 2a can be prevented by the extension 342 can be increased. Therefore, the deflection or warping of the reflective sheet 2a can be more prevented by the extension 342. Furthermore, compared to the configuration in which the extension 42 does not extend in the Z2 direction side than the second contact surface 40d, the optical member 2 can be further prevented from falling out of the guide member 4. As a result, the deterioration of the display quality can be further prevented.

Figure 13:
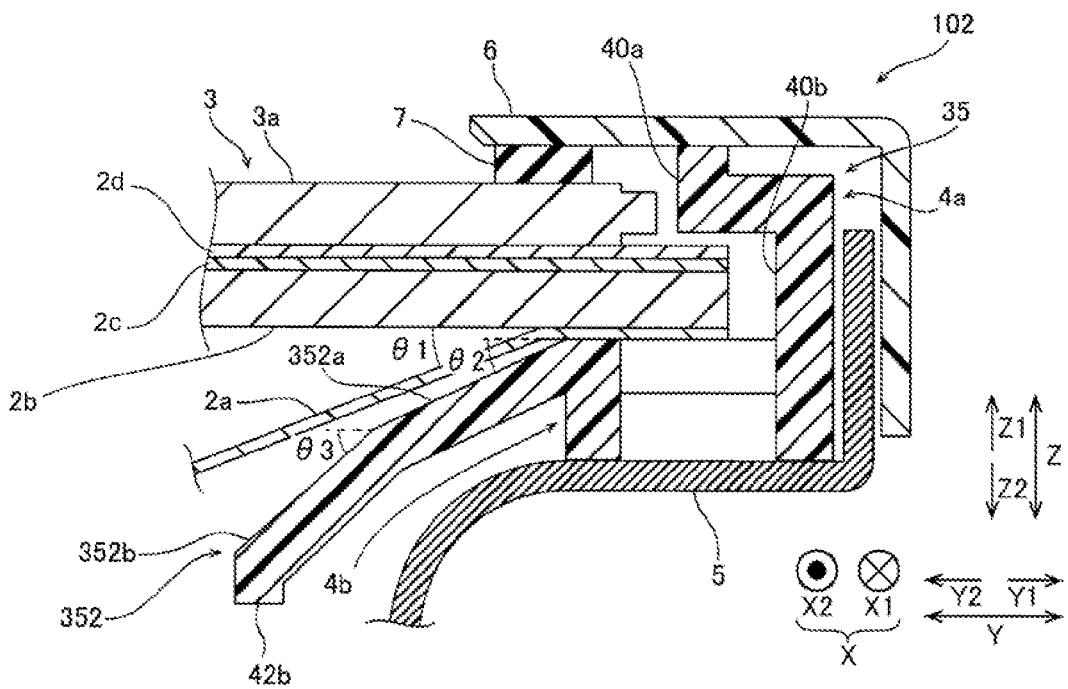
FIG. 13 is a cross-sectional view of a television device according to a second modification example of the first embodiment, taken along the 600-600 line.

In the first embodiment above, an example of the configuration in which the inclination angle of the inclined surface 42a of the extension 42 is constant is shown, but the present invention is not limited to this. For example, the inclination angle of the inclined surface 42a of the extension 42 does not need to be constant. Specifically, as shown in FIG. 13, an extension 352 of a guide member 35 is provided to a television device 102 according to a second modification example of the first embodiment, and the extension 352 has an inclined surface 352a and an inclined surface 352b with different inclination angles. In the example shown in FIG. 13, the inclined surface 352a is inclined at an inclination angle θ2. The inclined surface 352b is inclined at an inclination angle θ3 that is a greater angle than the inclination angle θ2.

Figure 14:
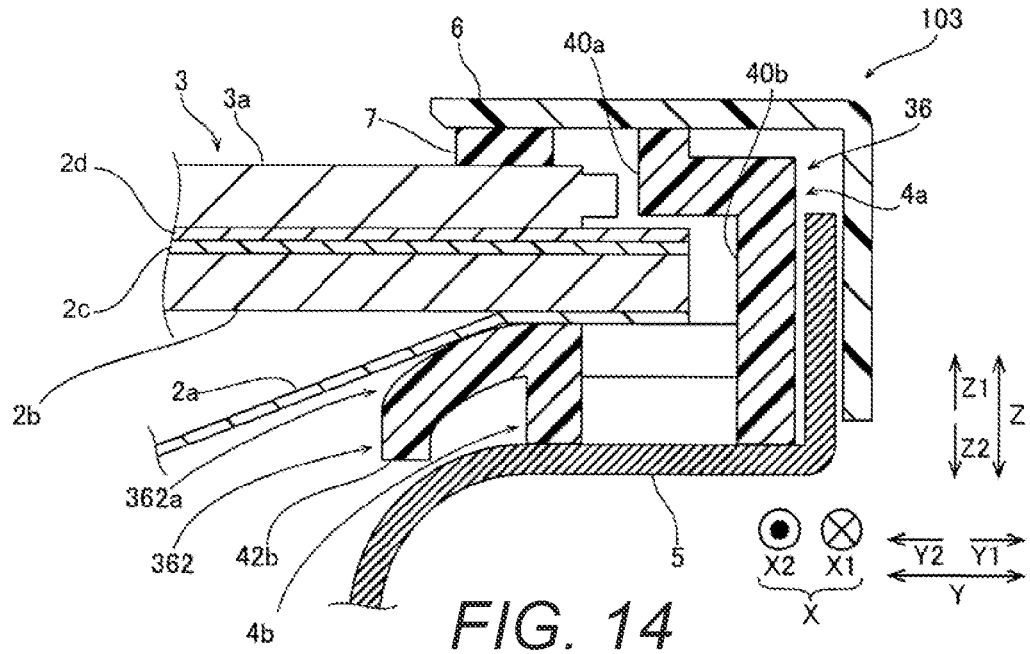
FIG. 14 is a cross-sectional view of a television device according to a third modification example of the first embodiment, taken along the 600-600 line.

In the first embodiment above, an example of the configuration in which the extension 42 has a flat inclined surface 42a is shown, but the present invention is not limited to this. For example, an extension can have an inclined surface that is not a flat surface. Specifically, as shown in FIG. 14, an extension 362 of a guide member 36 is provided to a television device 103 according to a third modification example of the first embodiment, and the extension 362 has an inclined surface 362a that is a curved surface that protrudes toward the reflective sheet 2a.

Figure 15:
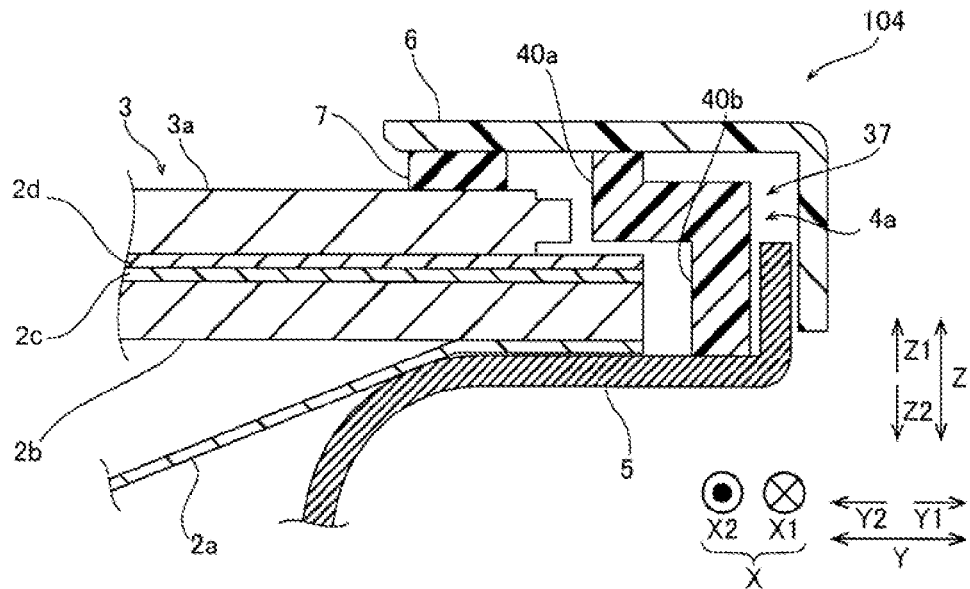
FIG. 15 is a cross-sectional view of a television device according to a fourth modification example of the first embodiment, taken along the 600-600 line.

In the first embodiment above, an example of the configuration in which the guide member 4 has the first positioning section 4a and the second positioning section 4b is shown, but the present invention is not limited to this. For example, as shown in FIG. 15, a guide member 37 can be provided to a television device 104 according to a fourth modification example of the first embodiment. The guide member 37 is configured not to have a second positioning section, but is configured to have the first positioning section 4a. That is, the guide member 37 is configured to have only the first positioning section 4a. When the guide member 37 does not have a second positioning section, the optical member 2 can be positioned in the Z direction by bending the rear frame 5 such that the rear frame 5 contacts the optical member 2, as shown in FIG. 15.

Figure 16:
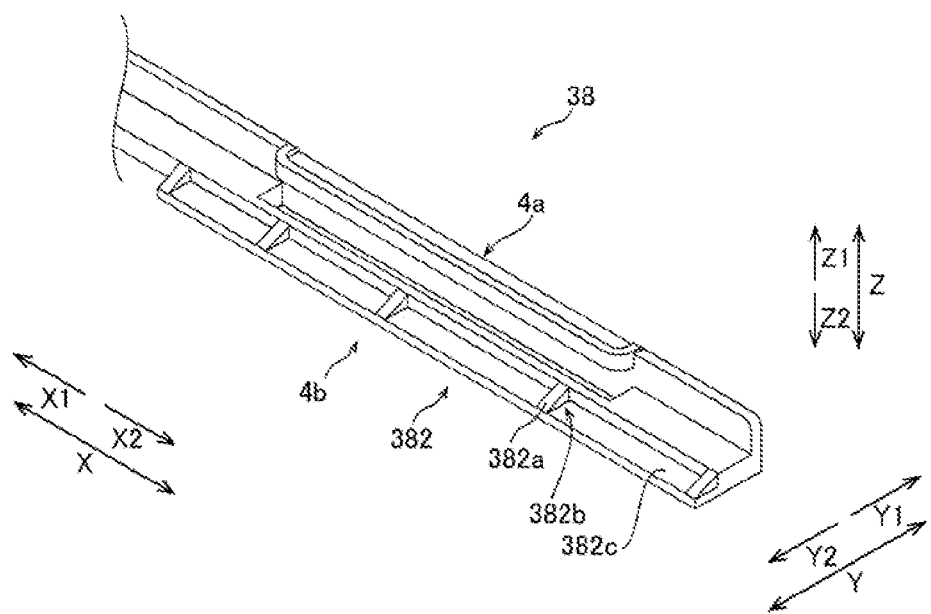
FIG. 16 is a perspective view showing a guide member according to a fifth modification example of the first embodiment.

In the first embodiment above, an example of the configuration in which the extension 42 of the guide member 4 has the inclined surface 42a that extends along the first region R1 and the second region R2 is shown, but the present invention is not limited to this. For example, as shown in FIG. 16, in a fifth modification example of the first embodiment, an extension 382 of a guide member 38 can have a plurality of ribs 382b that have inclined surfaces 382a, respectively, and a connector 382c that connects the ribs 382b. Alternatively, the extension 382 of the guide member 38 can be configured to have only the ribs 382b without having the connector 382c.

Figure 17:
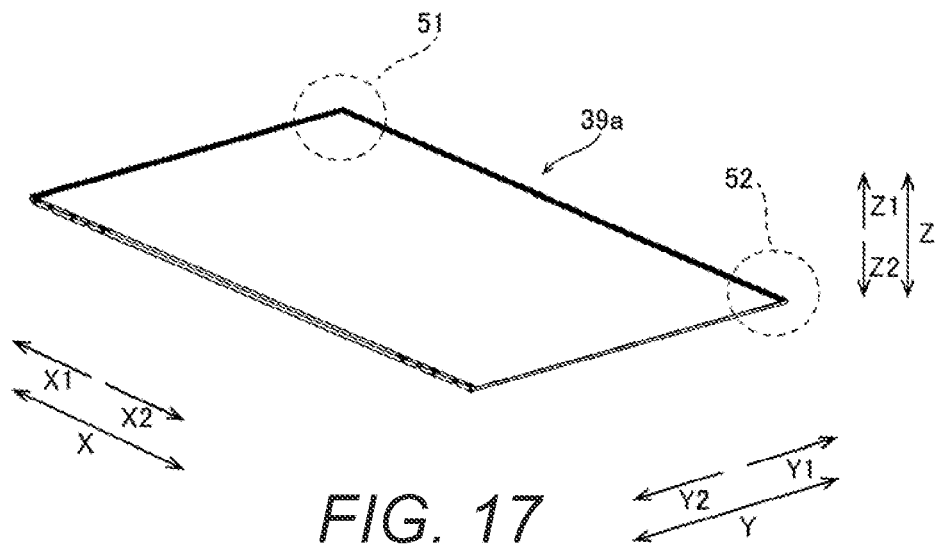
FIG. 17 is a perspective view showing a guide member according to a sixth modification example of the first embodiment.

In the first embodiment above, an example of the configuration in which the guide member 4 has an L-shape is shown, but the present invention is not limited to this. For example, as shown in FIG. 17, in a sixth modification example of the first embodiment, a guide member 39a can have a frame shape. Specifically, the guide member 39a is integrally formed in the frame shape as a one-piece, unitary member. When the guide member 39a has a frame shape, the first positioning section 4a and the second positioning section 4b can be provided at at least two locations on the upper side (Y1 direction side) of the corners of the casing. Specifically, with the guide member 39a, at least in each of regions 51 and 52, the first positioning section 4a and the second positioning section 4b can be provided on the edge of the X-direction and the edge of the Y-direction.

Figure 18:
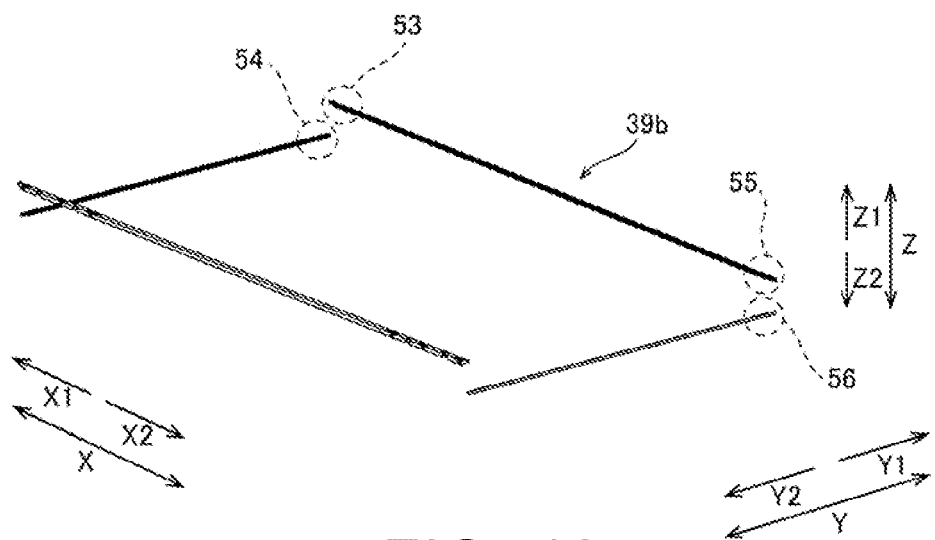
FIG. 18 is a perspective view showing a guide member according to a seventh modification example of the first embodiment.

In the first embodiment above, an example of the configuration in which the guide member 4 has an L-shape is shown, but the present invention is not limited to this. For example, as shown in FIG. 18, in a seventh modification example of the first embodiment, a guide member 39b can be formed by four separate members each having a linear shape. When the guide member 39b is formed by four separate members each having the linear shape, the first positioning section 4a and the second positioning section 4b can be provided at at least two locations on the upper side (Y1 direction side) of the corner of the casing. Specifically, with the guide member 39b, at least in each of regions 53 to 56, the first positioning section 4a and the second positioning section 4b can be provided.

In the first embodiment above, an example of the configuration in which the guide member 4 is provided at at least two upper corners of the corners of the casing is shown, but the present invention is not limited to this. The guide member 4 can be provided at two lower corners of the casing, or at four upper and lower corners of the casing.

Figure 19:
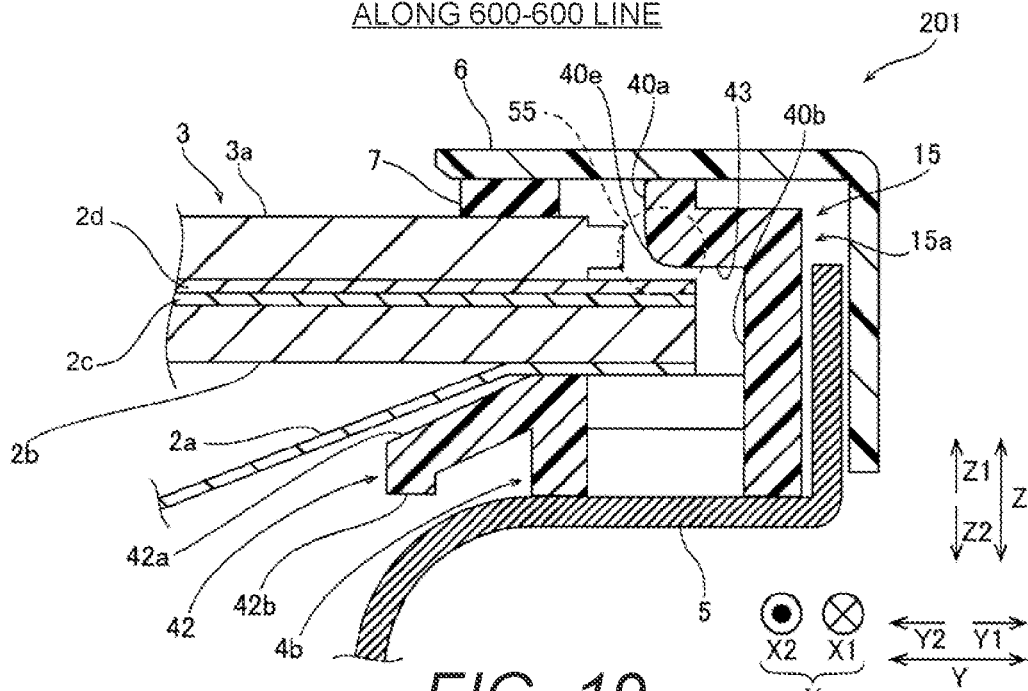
FIG. 19 is a cross-sectional view of a television device according to a modification example of the second embodiment, taken along the 600-600 line.

In the second embodiment above, an example of the configuration in which the connection portion 40e between the first side surface 40a and the first connection surface 43 of the guide member 14 is C-chamfered is shown, but the present invention is not limited to this. For example, as shown in FIG. 19, a guide member 15 of a modification example of the second embodiment can include a connection portion 40e. The connection portion 40e connects the first side surface 40a of a first positioning section 15a to the first connection surface 43, and is R-chamfered at a position encircled by a circle 55.

Figure 20:
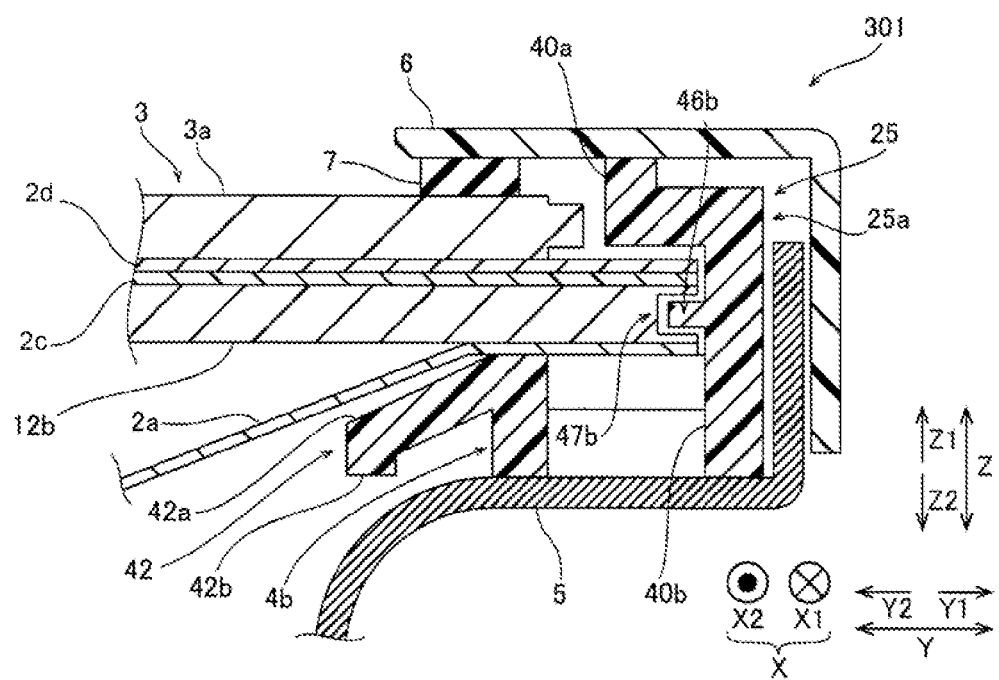
FIG. 20 is a cross-sectional view of a television device according to a first modification example of the third embodiment, taken along the 600-600 line.

In the third embodiment described above, an example of the configuration in which the engaging portion 46a is provided to the side surface of the diffusion plate 12a on the Y1 direction side and the engaged portion 47a is provided to the second side surface 40b is shown, but the present invention is not limited to this. For example, as shown in FIG. 20, a guide member 25 can be provided to a television device 301 of a first modification example of the third embodiment. Specifically, an engaging portion 46b is provided to the second side surface 40b of a first positioning section 25a of the guide member 25, and an engaged portion 47b is provided to a side surface of a diffusion plate 12b on the Y1 direction side. In the example shown in FIG. 20, the first positioning section 25a of the guide member 25, which is provided on an edge along the X direction, and the side surface of the diffusion plate 12b opposite the second side surface 40b along the X direction are described. Thus, the engaging portion 46b has a shape protruding from the side surface of the diffusion plate 12*b* on the Y1 direction side toward the second side surface 40*b*, and the engaged portion 47*b* is provided that engages with the engaging portion 46*b* of the second side surface 40*b*. For the first positioning section 25*a* of the guide member 25, which is provided on an edge along the Y direction, the engaging portion 46*b* has a shape protruding from the side surface of the diffusion plate 12*b* in the X1 direction (or X2 direction) toward the second side surface 40*b* along the Y direction. The engaged portion 47*b* is also provided at a position to engage with the engaging portion 46*b* of the second side surface 40*b* along the Y direction.

Figure 21:
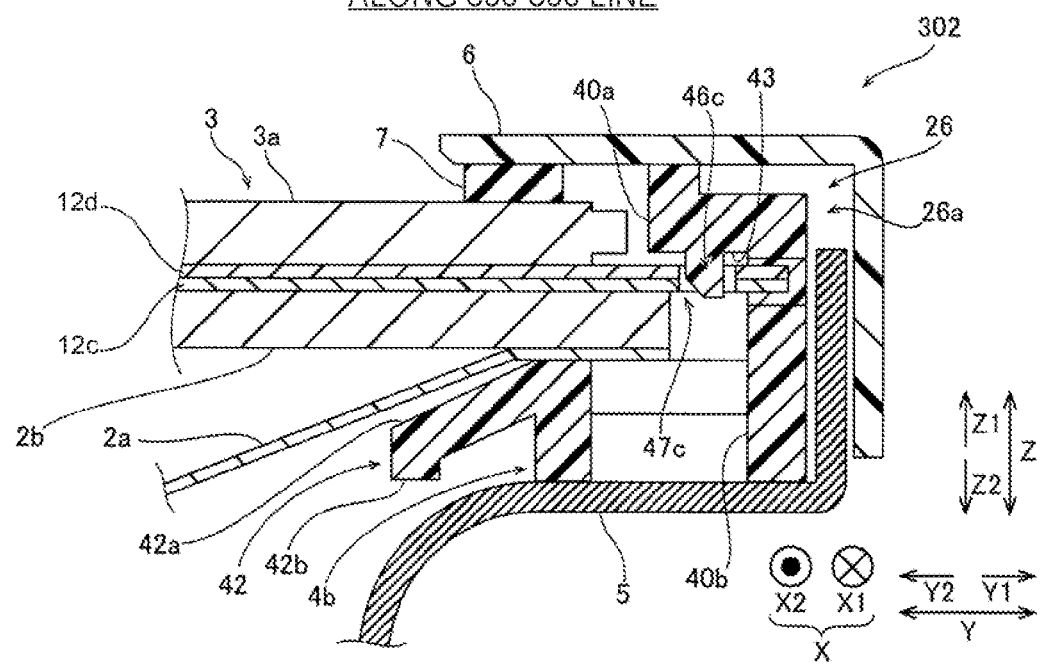
FIG. 21 is a cross-sectional view of a television device according to a second modification example of the third embodiment, taken along the 600-600 line.

In the third embodiment described above, an example of the configuration in which the engaging portion 46*a* is provided to the side surface of the diffusion plate 12*a* on the Y1 direction side and the engaged portion 47*a* is provided to the second side surface 40*b* is shown, but the present invention is not limited to this. For example, as shown in FIG. 21, a guide member 26 can be provided to a television device 302 of a second modification example of the third embodiment. Specifically, an engaging portion 46*c* protruding in the Z2 direction from the first connection surface 43 of a first positioning section 26*a* is provided to the guide member 26, and an engaged portion 47*c* that engages with the engaging portion 46*c* is provided to an optical sheet 12*c* and an optical sheet 12*d*. In particular, as shown in FIG. 21, the engaging portion 46*c* has a protrusion that protrudes in the Z2 direction from the first connection surface 43. The engaged portion 47*c* includes a hole formed on each of the optical sheet 12*c* and the optical sheet 12*d*. Specifically, as shown in FIG. 21, the holes are formed at end portions of the optical sheet 12*c* and the optical sheet 12*d* that protrudes outward (the Y1 direction side) relative to the side surfaces of the reflective sheet 2*a* and the diffusion plate 2*b*. Furthermore, the end portions of the optical sheet 12*c* and the optical sheet 12*d* can be received by a space or recess formed on the first positioning section 26*a* of the guide member 26. With this configuration, the optical member 2 and the guide member 26 are engaged with each other by inserting the protrusion of the engaging portion 46*c* into the holes of the engaged portion 47*c*.

In the first to fifth embodiments above, examples of the configuration in which the distances from the second side surface 40*b* to the side surfaces 20*a*, 20*b*, 20*c* and 20*d* of the reflective sheet 2*a*, the diffusion plate 2*b* (12*b*), the optical sheet 2*c* and the optical sheet 2*d* are all equal to each other are shown, but the present invention is not limited to this. For example, the distances from the second side surface 40*b* to the side surfaces 20*a*, 20*b*, 20*c* and 20*d* of the reflective sheet 2*a*, the diffusion plate 2*b* (12*b*), the optical sheet 2*c* and the optical sheet 2*d* need not all be equal to each other, as long as the overlap allowance of the optical member 2 is ensured. In other words, the distances from the second side surface 40*b* to the side surfaces 20*a*, 20*b*, 20*c* and 20*d* of the reflective sheet 2*a*, the diffusion plate 2*b* (12*b*), the optical sheet 2*c* and the optical sheet 2*d* can be different from each other.

In the first to fifth embodiments above, examples of the configuration in which the hole 45 penetrating in the thickness direction of the display cell 3 is provided in the first region R1 of the second connection surface 44 are shown, but the present invention is not limited to this. The second connection surface 44 can be configured not to have the hole 45.

In the first to fifth embodiments above, examples are shown in which the light source 1 is a backlight type are shown, but the present invention is not limited to this. For example, the light source 1 can be an edge-lit type.

(1) In view of the state of the known technology and in accordance with a first aspect of the present invention, a display device comprises a light source, an optical member, a display cell and a guide member. The optical member is irradiated with light from the light source. The display cell is irradiated with the light passing through the optical member. The guide member has a first positioning section that positions the display cell and the optical member in a direction along a display surface of the display cell and a second positioning section that is formed integrally with the first positioning section and positions the display cell and the optical member in a thickness direction of the display cell. The first positioning section has a first side surface that is opposite a side surface of the display cell and a second side surface that is opposite a side surface of the optical member and is provided outside of the first side surface in the direction along the display surface of the display cell.

The display device according to the first aspect comprises the guide member having the first positioning section and the second positioning section. The first positioning section has the first side surface that is opposite the side surface of the display cell and the second side surface that is opposite the side surface of the optical member and is provided outside of the first side surface in the direction along the display surface of the display cell, as described above. With this configuration, the second side surface that is opposite the side surface of the optical member is provided outside of the first side surface that is opposite the side surface of the display cell. Thus, the side surface of the optical member can be positioned more outward, compared to a configuration in which the first side surface and the second side surface are provided at the same position. Therefore, when the optical member is placed on the guide member, the length of a portion in which the optical member and the guide member contact each other can be increased, and thus the overlap allowance of the optical member relative to the guide member can be increased. Therefore, even if the optical member is displaced during transportation, the optical member and the display cell can be prevented from falling out of the guide member. Also, since the side surface of the optical member can be positioned more outwardly, even if bright or dark lines are caused by the side surface of the optical member, the side surface of the optical member can be positioned at a position where the bright or dark lines are not visible on the display screen. As a result, the display quality of the display device can be prevented from being deteriorated while preventing the display device from becoming defective even when a narrower frame is achieved. Here, the overlap allowance is a length, in the direction perpendicular to the side surface of the display cell, of a portion where the optical member and the guide member overlap with each other when the optical member is placed on the guide member, for example. In other words, the overlap allowance means a length, in the direction perpendicular to the side surface of the display cell, of a portion where the optical member and the guide member contact each other, for example.

(2) In accordance with a preferred embodiment according to the display device mentioned above, the side surface of the optical member is disposed between the first side surface and the second side surface in the direction along the display surface of the display cell. Specifically, the side surface of the optical member can be disposed on a second side surface side than the first side surface in the direction along the display surface of the display cell. With this configuration, the side surface of the optical member can be placed more outward, compared to a configuration in which the side surface of the optical member is disposed at a position approximately equal to the first side surface or more inward than the first side surface. Therefore, when the optical member is placed on the guide member, the length of the portion in which the optical member and the guide member contact each other can be increased, and thus the overlap allowance of the optical member can be increased. Therefore, the optical member and the display cell can be placed more stably. In addition, since the overlap allowance of the optical member can be increased, it is possible to further prevent the display cell and the optical member from falling out due to displacement of the optical member during transportation, and to further prevent bright or dark lines caused by the side surface of the optical member from being visible on the display screen. As a result, the display quality of the display device can be further prevented from being deteriorated while further preventing the display device from becoming defective.

(3) In accordance with a preferred embodiment according to any one of the display devices mentioned above, a protrusion amount of the side surface of the optical member protruding toward the second positioning section from a surface of the second positioning section that is opposite the second side surface is greater than a thickness of the second positioning section in a direction perpendicular to the side surface of the display cell. Here, the overlap allowance of the optical member is the length, in the direction perpendicular to the side surface of the display cell, of a portion in which the optical member and the guide member contact each other. In other words, the overlap allowance of the optical member is the total length of the protrusion amount of the side surface of the optical member protruding toward the second side surface and the thickness of the second positioning section in the direction perpendicular to the side surface of the display cell. Therefore, if the protrusion amount of the side surface of the optical member protruding toward the second side surface is configured to be greater than the thickness of the second positioning section in the direction perpendicular to the side surface of the display cell, then the overlap allowance of the optical member, which is the length of the portion in which the optical member and the guide member contact each other, can be at least twice the thickness of the second positioning section in the direction perpendicular to the side surface of the display cell, and thus the overlap allowance of the optical member can be easily increased. As a result, the display quality of the display device can be easily prevented from being deteriorated.

(4) In accordance with a preferred embodiment according to any one of the display devices mentioned above, the second side surface is disposed at a position where a distance from a surface of the second positioning section that is opposite the second side surface to the second side surface is greater than a distance from the first side surface to the second side surface in the direction along the display surface of the display cell. With this configuration, for example, when the guide member is manufactured with a resin molding mold, the surface of the second positioning section that is opposite the second side surface is disposed inward than the first side surface, and thus it is possible to prevent the second side surface from interfering with the resin molding mold corresponding to the first side surface when releasing the resin molding mold corresponding to the first side surface. Therefore, when the guide member is manufactured with the resin molding mold, the resin molding mold can be easily released. As a result, the guide member in which the second side surface is disposed outside of the first side surface can be easily manufactured.

(5) In accordance with a preferred embodiment according to any one of the display devices mentioned above, the display device further comprises a casing including a rear frame that is disposed rearward of the optical member. Specifically, the rear frame can be provided on a back side of the optical member, for example. The second positioning section have an optical member contact surface that contacts the optical member from a rear frame side in the thickness direction of the display cell. The second positioning section is disposed between the optical member and the rear frame. With this configuration, the optical member can be prevented from directly contacting the rear frame. As a result, scratches on the optical member caused by the optical member contacting the rear frame during assembly can be prevented.

(6) In accordance with a preferred embodiment according to any one of the display devices mentioned above, the optical member includes a reflective sheet, a diffusion plate and an optical sheet that are laminated in order from the rear frame side. The reflective sheet, the diffusion plate and the optical sheet are arranged such that each side surface thereof is opposite the second side surface. With this configuration, by arranging each side surface of the reflective sheet, the diffusion plate and the optical sheet so as to be opposite the second side surface, the overlap allowance of the optical member can be securely ensured.

(7) In accordance with a preferred embodiment according to any one of the display devices mentioned above, the optical member contact surface contacts the reflective sheet. The reflective sheet is provided such that a distance between the reflective sheet and the display cell in the thickness direction of the display cell increases as extending toward a center of the display cell. The second positioning section has an extension extending along the reflective sheet at a position between the reflective sheet and the rear frame. With this configuration, since the extension extends along the reflective sheet, for example, even when a shock is applied to the reflective sheet, the deflection or warping of the reflective sheet can be prevented by the extension. In addition, compared to a configuration in which the extension is not provided to the second positioning section, the optical member can be more prevented from falling out of the guide member. As a result, the display quality of the display device can be further prevented from being deteriorated while further preventing the display device from becoming defective.

(8) In accordance with a preferred embodiment according to any one of the display devices mentioned above, the extension has an inclined surface extending along the reflective sheet. With this configuration, the deflection or warping of the portion of the reflective sheet in which the reflective sheet is arranged at an angle can be easily prevented by the inclined surface.

(9) In accordance with a preferred embodiment according to any one of the display devices mentioned above, the guide member is formed in an L-shape along corners of the display cell and the optical member, and is provided to at least two upper corners of corners of the casing. With this configuration, for example, the size of the guide member can be reduced, compared to a configuration in which the guide member is formed in a frame shape, and thus handling during assembly can be easily ensured. In addition, unlike the configuration in which the guide member is formed in the frame shape, it can also be applied to an edge-lit type display device, and thus the degree of freedom in selecting a type of lighting for the display device can be improved.

(10) In accordance with a preferred embodiment according to any one of the display devices mentioned above, the casing further includes a front bezel that is disposed forward of the display cell. Specifically, the front bezel can be provided on a front surface side of the display cell. The guide member has a first contact surface that contacts the front bezel and a second contact surface that contacts the rear frame in the thickness direction of the display cell. With this configuration, since the guide member contacts both the front bezel and the rear frame, the guide member can be stably disposed, compared to a configuration in which the guide member contacts only one of the front bezel and the rear frame. As a result, the optical member and the display cell can be stably disposed.

(11) In accordance with a preferred embodiment according to any one of the display devices mentioned above, the first side surface and the second side surface are connected by a first connection surface extending in a direction perpendicular to the side surface of the display cell and the side surface of the optical member. A connection portion between the first connection surface and the first side surface is chamfered. With this configuration, the optical member and the display cell can be prevented from being caught in the connection portion when attaching the optical member and the display cell to the guide member, compared to a configuration in which the connection portion is not chamfered. As a result, the optical member and the display cell can be easily assembled.

(12) In accordance with a preferred embodiment according to any one of the display devices mentioned above, the first positioning section includes a first region in which both the first side surface and the second side surface are provided, and a second region in which the second side surface is provided but the first side surface is not provided. The first positioning section and the second positioning section are connected by a second connection surface extending in a direction perpendicular to the side surface of the display cell and the side surface of the optical member. With this configuration, the first positioning section and the second positioning section are connected by the second connection surface, and thus the guide member can be easily formed as one piece.

(13) In accordance with a preferred embodiment according to any one of the display devices mentioned above, one of the optical member and the first positioning section is provided with an engaging portion. The other one of the optical member and the first positioning section is provided with an engaged portion that engages with the engaging portion. With this configuration, the optical member can be fixed to the first positioning section by the engaging portion and the engaged portion. As a result, the optical member can be reliably prevented from falling out of the guide member during transportation and the like.

(14) In accordance with a preferred embodiment according to any one of the display devices mentioned above, the display device further comprises a first elastic member provided between the side surface of the display cell and the first side surface. The first elastic member has an end surface on one side that contacts the side surface of the display cell and an end surface on the other side that contacts the first side surface. With this configuration, the display cell can be securely positioned by the first elastic member. As a result, the display cell can be reliably prevented from falling out of the guide member.

(15) In accordance with a preferred embodiment according to any one of the display devices mentioned above, the display device further comprises a second elastic member provided between the side surface of the optical member and the second side surface. The second elastic member has an end surface on one side that contacts the side surface of the optical member and an end surface on the other side that contacts the second side surface. With this configuration, the optical member can be securely positioned by the second elastic member. As a result, the optical member can be reliably prevented from falling out of the guide member.

(16) In accordance with a preferred embodiment according to any one of the display devices mentioned above, the display cell is disposed forward of the optical member and contacts the optical member. Specifically, the display cell can be provided on a front surface side of the optical member in contact with the optical member. With this configuration, it is possible to prevent an increase in the size of the display device in the thickness direction, compared to a configuration in which the display cell is provided without being in contact with the optical member. As a result, the display device can be made thinner.

(17) In view of the state of the known technology and in accordance with a second aspect of the present invention, a display device comprises a light source, an optical member, a display cell, a guide member, and a casing. The optical member is irradiated with light from the light source. The display cell is irradiated with the light passing through the optical member. The guide member includes a first positioning section that has a first side surface that is opposite a side surface of the display cell and a second side surface that is opposite a side surface of the optical member and is provided outside of the first side surface. The first positioning section positions the display cell and the optical member in a direction along a display surface of the display cell. The casing includes a front bezel that is disposed forward of the display cell and a rear frame that is disposed rearward of the optical member. Specifically, the front bezel can be provided on a front surface side of the display cell and the rear frame can be provided on a back side of the optical member, for example. The guide member has a first contact surface that contacts the front bezel and a second contact surface that contacts the rear frame in the thickness direction of the display cell.

The display device according to the second aspect comprises the guide member including the first positioning section that positions the display cell and the optical member in the direction along the display surface of the display cell. The guide member has the first contact surface that contacts the front bezel and the second contact surface that contacts the rear frame in the thickness direction of the display cell, as described above. With this configuration, as with the display device according to the first aspect above, it is possible to provide a display device capable of preventing that the display quality of the display device is deteriorated while preventing that the display device becomes defective even when a narrower frame is achieved. In addition, since the guide member contacts both the front bezel and the rear frame, the guide member can be disposed more stably, compared to a configuration in which the guide member contacts only one of the front bezel and the rear frame. As a result, the optical member and the display cell can be stably disposed.

(18) In accordance with a preferred embodiment according to the display device mentioned above, the guide member further includes a second positioning section that positions the display cell and the optical member in the thickness direction of the display cell by contacting the optical member in the thickness direction of the display cell.

(19) In accordance with a preferred embodiment according to any one of the display devices mentioned above, the casing positions the display cell and the optical member in the thickness direction of the display cell by contacting the optical member in the thickness direction of the display cell.

(20) In accordance with a preferred embodiment according to any one of the display devices mentioned above, the first positioning section of the guide member has the first contact surface and the second contact surface.

According to the present invention, it is possible to provide a display device capable of preventing a display quality of the display device from being deteriorated while preventing the display device from becoming defective even when a narrower frame is achieved.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a television device or display device in an upright position. Accordingly, these directional terms, as utilized to describe the television device or display device should be interpreted relative to a television device or display device in an upright position on a horizontal surface. The terms "left" and "right" are used to indicate the "right" as viewed from the front of the television device or display device, and the "left" as viewed from the front of the television device or display device.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A display device comprising:
   a light source;
   an optical member irradiated with light from the light source;
   a display cell irradiated with the light passing through the optical member; and
   a guide member having a first positioning section that positions the display cell and the optical member in a direction along a display surface of the display cell, and a second positioning section that is formed integrally with the first positioning section and positions the display cell and the optical member in a thickness direction of the display cell,
   the first positioning section having a first side surface that is opposite a side surface of the display cell and a second side surface that is opposite a side surface of the optical member and is provided outside of the first side surface in the direction along the display surface of the display cell.

2. The display device according to claim 1, wherein the side surface of the optical member is disposed between the first side surface and the second side surface in the direction along the display surface of the display cell.

3. The display device according to claim 2, wherein a protrusion amount of the side surface of the optical member protruding toward the second side surface from a surface of the second positioning section that is opposite the second side surface is greater than a thickness of the second positioning section in a direction perpendicular to the side surface of the display cell.

4. The display device according to claim 1, wherein the second side surface is disposed at a position where a distance from a surface of the second positioning section that is opposite the second side surface to the second side surface is greater than a distance from the first side surface to the second side surface in the direction along the display surface of the display cell.

5. The display device according to claim 1, further comprising
   a casing including a rear frame that is disposed rearward of the optical member,
   the second positioning section having an optical member contact surface that contacts the optical member from a rear frame side in the thickness direction of the display cell, and
   the second positioning section being disposed between the optical member and the rear frame.

6. The display device according to claim 5, wherein
the optical member includes a reflective sheet, a diffusion plate and an optical sheet that are laminated in order from the rear frame side, and
the reflective sheet, the diffusion plate and the optical sheet are arranged such that each side surface thereof is opposite the second side surface.

7. The display device according to claim 6, wherein
the optical member contact surface contacts the reflective sheet,
the reflective sheet is provided such that a distance between the reflective sheet and the display cell in the thickness direction of the display cell increases as extending toward a center of the display cell, and
the second positioning section has an extension extending along the reflective sheet at a position between the reflective sheet and the rear frame.

8. The display device according to claim 7, wherein
the extension has an inclined surface extending along the reflective sheet.

9. The display device according to claim 5, wherein
the guide member is formed in an L-shape along corners of the display cell and the optical member, and is provided to at least two upper corners of corners of the casing.

10. The display device according to claim 5, wherein
the casing further includes a front bezel that is disposed forward of the display cell, and
the guide member has a first contact surface that contacts the front bezel and a second contact surface that contacts the rear frame in the thickness direction of the display cell.

11. The display device according to claim 1, wherein
the first side surface and the second side surface are connected by a first connection surface extending in a direction perpendicular to the side surface of the display cell and the side surface of the optical member, and
a connection portion between the first connection surface and the first side surface is chamfered.

12. The display device according to claim 1, wherein
the first positioning section includes a first region in which both the first side surface and the second side surface are provided, and a second region in which the second side surface is provided but the first side surface is not provided, and
the first positioning section and the second positioning section are connected by a second connection surface extending in a direction perpendicular to the side surface of the display cell and the side surface of the optical member.

13. The display device according to claim 1, wherein
one of the optical member and the first positioning section is provided with an engaging portion, and
the other one of the optical member and the first positioning section is provided with an engaged portion that engages with the engaging portion.

14. The display device according to claim 1, further comprising
a first elastic member provided between the side surface of the display cell and the first side surface, the first elastic member having an end surface on one side that contacts the side surface of the display cell and an end surface on the other side that contacts the first side surface.

15. The display device according to claim 1, further comprising
a second elastic member provided between the side surface of the optical member and the second side surface, the second elastic member having an end surface on one side that contacts the side surface of the optical member and an end surface on the other side that contacts the second side surface.

16. The display device according to claim 1, wherein
the display cell is disposed forward of the optical member and contacts the optical member.

17. A display device comprising:
a light source;
an optical member irradiated with light from the light source;
a display cell irradiated with the light passing through the optical member;
a guide member including a first positioning section that has a first side surface that is opposite a side surface of the display cell and a second side surface that is opposite a side surface of the optical member and is provided outside of the first side surface, the first positioning section positioning the display cell and the optical member in a direction along a display surface of the display cell; and
a casing including a front bezel that is disposed forward of the display cell and a rear frame that is disposed rearward of the optical member,
the guide member having a first contact surface that contacts the front bezel and a second contact surface that contacts the rear frame in a thickness direction of the display cell.

18. The display device according to claim 17, wherein
the guide member further includes a second positioning section that positions the display cell and the optical member in the thickness direction of the display cell by contacting the optical member in the thickness direction of the display cell.

19. The display device according to claim 17, wherein
the casing positions the display cell and the optical member in the thickness direction of the display cell by contacting the optical member in the thickness direction of the display cell.

20. The display device according to claim 17, wherein
the first positioning section of the guide member has the first contact surface and the second contact surface.

* * * * *